United States Patent
Itoh

(10) Patent No.: US 7,794,802 B2
(45) Date of Patent: Sep. 14, 2010

(54) POLYMERIZABLE LIQUID CRYSTAL COMPOUND, COMPOSITION AND POLYMER

(75) Inventor: Maiko Itoh, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 50 days.

(21) Appl. No.: 12/379,754

(22) Filed: Feb. 27, 2009

(65) Prior Publication Data
US 2010/0076171 A1    Mar. 25, 2010

(30) Foreign Application Priority Data
Feb. 27, 2008   (JP)   ............... 2008-045938
Feb. 4, 2009    (JP)   ............... 2009-023397

(51) Int. Cl.
G02B 5/30       (2006.01)
C09K 19/36      (2006.01)
C09K 19/38      (2006.01)
C07J 1/00       (2006.01)
C07J 53/00      (2006.01)

(52) U.S. Cl. ............... 428/1.1; 252/299.01; 252/299.7; 552/502; 552/510; 552/540

(58) Field of Classification Search ............... 552/502, 552/510, 540; 428/1.1; 252/299.7, 299.01
See application file for complete search history.

(56) References Cited

U.S. PATENT DOCUMENTS

| | | | |
|---|---|---|---|
| 3,686,235 A | 8/1972 | Nicholas et al. | |
| 5,599,478 A | 2/1997 | Matumoto et al. | |
| 6,685,998 B1 | 2/2004 | Nishikawa et al. | |
| 2010/0086506 A1* | 4/2010 | Tanabe | 424/63 |

FOREIGN PATENT DOCUMENTS

| | | |
|---|---|---|
| GB | 2 298 202 | 8/1996 |
| WO | 02/28985 | 4/2002 |

OTHER PUBLICATIONS

English abstract of JP 8-87008 published Apr. 2, 1996.
English abstract of JP 2002-006138 published Jan. 9, 2002.
Y. Hisatake et al., "A Novel Transflective TFT-LCD Using Cholestric Half Reflector", Asia Display/IDW '01, LCT8-2, pp. 129-132 (2001).
Alexey Yu. Bobrovsky et al., "New Chiral-Photochromic Dopant with Variable Helical Twisting Power and its use in Photosenstive Cholesteric Materials", Mol. Cryst. Liq. Cryst., vol. 363, pp. 35-50 (2001).

* cited by examiner

*Primary Examiner*—Shean C Wu
(74) *Attorney, Agent, or Firm*—Wenderoth, Lind & Ponack, L.L.P.

(57) ABSTRACT

A polymerizable liquid crystal compound that has a wide liquid crystal phase temperature range and has a sterol ferulate skeleton, and a liquid crystal composition containing the compound are provided. A polymer that is excellent in various characteristics, and a molded article having optical anisotropy produced with the polymer are obtained with the polymerizable liquid crystal compound. The compound is represented by formula (1):

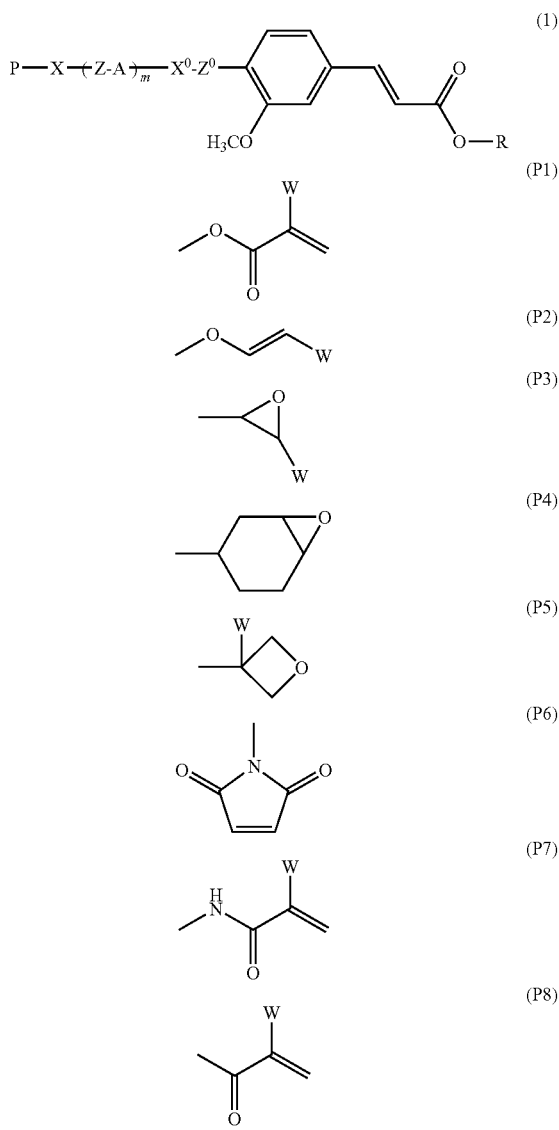

wherein R represents a sterol moiety derived from vegetable organisms; P represents one of polymerizable groups represented by formulae (P1) to (P8); X, Z, $X^0$ and $Z^0$ each represent a bonding group; and A represents a divalent group having a cyclic structure.

30 Claims, 5 Drawing Sheets

POLYMERIZABLE LIQUID CRYSTAL COMPOUND, COMPOSITION AND POLYMER

BACKGROUND OF THE INVENTION

1. Field of the Invention

The present invention relates to an optically active compound having a sterol ferulate group and a polymerizable group, a liquid crystal composition containing the optically active compound, a polymer containing the optically active compound or the liquid crystal composition having been polymerized, and a use of the polymer.

2. Description of Related Art

In recent years, a polymerizable liquid crystal compound is used in a molded article having optical anisotropy. The compound has optical anisotropy in a liquid crystal state, and the orientation of the liquid crystal compound is immobilized by polymerization.

The addition of an optically active compound to a polymerizable liquid crystal composition induces a helical structure, and various applications as optical devices are available depending on the pitch of the helical structure. That is, the propagation of light in the helical axis is classified depending on the wavelength ($\lambda$) of the target light and the length of the helical pitch (P) into the case (1) where $\lambda \ll P$ and the case (2) where $\lambda \approx P$.

Where the target $\lambda$ is visible light, the case (1) where $\lambda \ll P$ corresponds to the case where 1 ($\mu$m)<P. The application in this case is classified into the case where the Mauguin condition is satisfied and the case where it is not. In the case (A) where the Mauguin condition is satisfied, i.e., the condition where $\Phi \ll 2\pi\Delta nd/\lambda$ is satisfied, linearly polarized light agreeing with or perpendicular to the optical axis on the incident side is emitted as linearly polarized light maintained, whereby the linearly polarized light functions as a rotator. Herein, $\Phi$ represents the total twist angle, d represents the thickness, and $\Delta n$ represents the birefringence of the liquid crystal. In the case (B) where the Mauguin condition is not satisfied, the linearly polarized light shows birefringence that is determined by $\Phi$, d and $\Delta n$.

The rotator can be applied to an optical device for a head-up display and a projector. An application of birefringence of twist orientation includes, for example, optical compensation in an STN (super twisted nematic) type liquid crystal display (as described in JP-A-8-87008 (U.S. Pat. No. 5,599,478)).

Where the target $\lambda$ is visible light, in the case (2) where $\lambda \approx P$, for example, where the twist direction of the helical structure is right hand, the liquid crystal film selectively reflects only clockwise circularly polarized light having a wavelength $\lambda$ in a range of no×P<$\lambda$<ne×P (where no represents the refractive index of the liquid crystal layer to normal light, and ne represents the refractive index of the liquid crystal layer to abnormal light), and transmits all clockwise circularly polarized light having a wavelength outside the range and anticlockwise circularly polarized light having any wavelength. In other words, clockwise circularly polarized light and anticlockwise circularly polarized light can be selectively separated from each other at a specific wavelength (circularly polarized light dichroic property). From the standpoint of application of an optical device, specifically, it is classified into the case (A) where 350/$n_{ave}$ (nm)<P≦800/$n_{ave}$ (nm), i.e., the wavelength range of the circularly polarized light dichroic property is in the visible region, and the case (B) where P<350/$n_{ave}$ (nm), i.e., the wavelength range of the circularly polarized light dichroic property is in the ultraviolet region (where $n_{ave}=((ne^2+no^2)/2)^{0.5}$).

In the case (A) where 350/$n_{ave}$ (nm)<P≦800/$n_{ave}$ (nm), when unpolarized light is incident, reflected light and transmitted light are colored corresponding to the wavelength causing the circularly polarized light dichroic property. By using the coloration, the device can be applied to a color filter used for design purpose, such as ornament materials, and for a liquid crystal display device. The device can also be applied to anticounterfeit technology since reflected light and transmitted light have unique metallic luster with change in color tone depending on viewing angle, and these optical characteristics cannot be reproduced by a duplicator. Furthermore, the light utilizing efficiency in a liquid crystal display device can be improved by utilizing the circularly polarized light separation function. For example, such a constitution has been proposed that a ¼λ plate and an optically anisotropic film exhibiting the circularly polarized light separation function are accumulated on a polarizing plate (as described in Y. Hisatake, et al., Asia Display/IDW '01, LCT8-2). In these purposes, it is demanded to exhibit the circularly polarized light separation function over the entire visible light region (region having a wavelength of from 350 to 750 nm), layers having different pitches may be accumulated, or in alternative, the pitch may be changed consecutively in the thickness direction. The reflection spectrum width $\Delta\lambda$ is larger when the birefringence anisotropy value ($\Delta n$) is large owing to the relational expression $\Delta\lambda = \Delta n \times P$. The reflection spectrum center wavelength $\lambda c$ is calculated from the relational expression $\lambda c = n_{ave} \times P$.

When the helical pitch P is set in a range of 700/$n_{ave}$ (nm)<P≦1.5/$n_{ave}$ ($\mu$m), such an application as a reflection filter for an ultraviolet ray or a near infrared ray can be attained by utilizing the similar circularly polarized light separation function.

In the case (B) where P<350/$n_{ave}$ (nm), the refractive index in the visible range on a plane perpendicular to the helical axis is expressed by $((ne^2+no^2)/2)^{0.5}$, and the refractive index in the visible range in the direction of the helical axis is equal to no (as described in W. H. de Jeu, Physical Properties of Liquid Crystalline Materials, Gordon and Breach, New York (1980)).

The optically anisotropic film having the optical characteristics is referred to as a negative C-plate. In a liquid crystal display device that shows black display (dark state) when liquid crystal molecules exhibiting positive birefringence are oriented in the direction perpendicular to the substrate, no birefringence is exhibited in the normal line direction of the display device by orientation of the liquid crystal molecules. In the display device, accordingly, a considerably high contrast can be obtained in the normal line direction. However, birefringence is exhibited in directions deviated from the normal line direction to increase the transmittance in the black display (dark state). In other words, the display device is decrease in contrast in the oblique viewing angle. The negative C-plate can compensate the birefringence caused in directions deviated from the normal line direction of the liquid crystal orientation direction in the display device. As a result, the negative C-plate can be used as an optical compensation plate suitable for improving viewing angle characteristics in such a display device as VA (vertically aligned), TN (twisted nematic), OCB (optically compensated birefringence) and HAN (hybrid aligned nematic).

A compressed polymer film or a film utilizing planarly oriented discotic liquid crystal having a negative birefringence is currently used as an optical compensation plate (as described in JP-A-2002-6138 (U.S. Pat. No. 6,685,998)). The use of a polymer of cholesteric liquid crystal formed of liquid crystal molecules having a positive birefringence enhances the degree of freedom upon designing the refractive index anisotropy value and the wavelength dispersion thereof. The negative C-plate can be used in combination with various optical compensation layers.

The pitch and Δn are appropriately controlled depending on the optical design for the aforementioned purposes.

In any of the aforementioned purposes, such a photopolymerizable liquid crystal composition is demanded that, as characteristics of the photopolymerizable liquid crystal before curing, has a liquid crystal phase at room temperature, has a wide liquid crystal phase, exhibits a good orientation property, and is rapidly cured by UV irradiation, and that, as characteristics after curing, has suitable Δn, has transparency, and is excellent in heat resistance and humidity resistance.

Upon optimizing a compound, it is necessary to satisfy the polymerization property and the physical and chemical properties of the polymer, in addition to the aforementioned optical characteristics. The physical and chemical properties include the polymerization rate and the polymerization degree of the compound, and the transparency, the mechanical strength, the coating property, the solubility, the degree of crystallinity, the contraction property, the water permeation property, water absorption property, the gas permeation property, the melting point, the glass transition point, the clearing point, the heat resistance and the chemical resistance of the polymer.

The addition of an optically active compound to a liquid crystal composition induces a helical structure (as described in GB-A No. 2,298,202 and WO No. 02/28985). The pitch (p) depends on the addition amount (concentration c) and the helical twisting power (HTP) of the optically active compound ($p=HTP^{-1} \times c^{-1}$). A liquid crystal composition having a helical structure can be applied to various purposes. Examples of the purposes include a PC (phase change) display device, a guest-host display device, a TN display device, an STN display device, a SSCT (surface stabilized cholesteric texture) display device, a PSCT (polymer stabilized cholesteric texture) display device and a negative C-plate.

In any of the purposes, it is preferred that the optically active compound is a compound that exhibits a liquid crystal phase within a wide temperature range for preventing the various properties, such as the viscosity and the liquid crystal property, from being adversely affected. In the case where the liquid crystal composition is applied to a polarizing plate, an optical compensation plate, such as a negative C-plate, an orientation film and the like, a molded article having optical anisotropy is utilized. Such a molded article is demanded that is excellent in polymerization degree, transparency, mechanical strength, coating property, solubility, degree of crystallinity, contraction property, water permeation property, water absorption property, gas permeation property, melting point, glass transition point, clearing point, heat resistance, chemical resistance and the like of the polymer. Furthermore, it is demanded that a liquid crystal composition containing an optically active compound is excellent in polymerization rate.

It has been known that an ester compound of sterol is a liquid crystal compound having a cholesteric phase (as described in U.S. Pat. No. 3,686,235), but there is no mention relating to introduction of a polymerizable group for immobilizing the cholesteric phase. It has been also known that a isosorbide cinnamate derivative or the like used as a chiral agent of a liquid crystal composition shifts the selective reflection wavelength since the structure and the physical properties thereof are altered by isomerization of the cinnamic acid moiety, which is contained in the skeleton of the compound of the invention, by light irradiation (as described in Alexey Yu. Bobrovsky, et al., Mol. Cryst. Liq. Cryst., vol. 363, pp. 35-50 (2001)).

SUMMARY OF THE INVENTION

A first object of the invention is to provide a polymerizable liquid crystal compound (and a mixture thereof) that has a wide liquid crystal phase temperature range and has a sterol ferulate skeleton, and a liquid crystal composition containing the compound. A second object of the invention is to provide a polymer that is excellent in many of various characteristics, such as transparency, mechanical strength, coating property, solubility, degree of crystallinity, contraction property, water permeation property, water absorption property, gas permeation property, melting point, glass transition point, clearing point, heat resistance and chemical resistance, and a molded article having optical anisotropy produced with the polymer. A third object of the invention is to provide a product containing the polymer, such as a polarizing plate, an optical compensation plate, an orientation film, a liquid crystal display device and a non-linear optical device.

As a result of investigations made by the inventors for attaining the aforementioned objects, it has been found that a polymerizable liquid crystal compound shown below that has a sterol ferulate skeleton has a wide cholesteric phase:

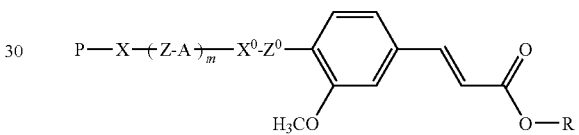

wherein P represents a polymerizable group; R represents a sterol moiety; A represents a cyclic group, such as 1,4-cyclohexylene and 1,4-phenylene; X, Z, $X^0$ and $Z^0$ each represent a bonding group; and m represents an integer of from 0 to 3. It has also been found that a liquid crystal composition containing the compound and a polymer thereof are excellent as an optical compensation film and the like. Thus, the invention has been completed. The compound of the invention can be produced with γ-oryzanol as a raw material, whereby a liquid crystal compound having a wide cholesteric phase temperature range can be produced easily and inexpensively.

DETAILED DESCRIPTION OF THE INVENTION

Figure 1:
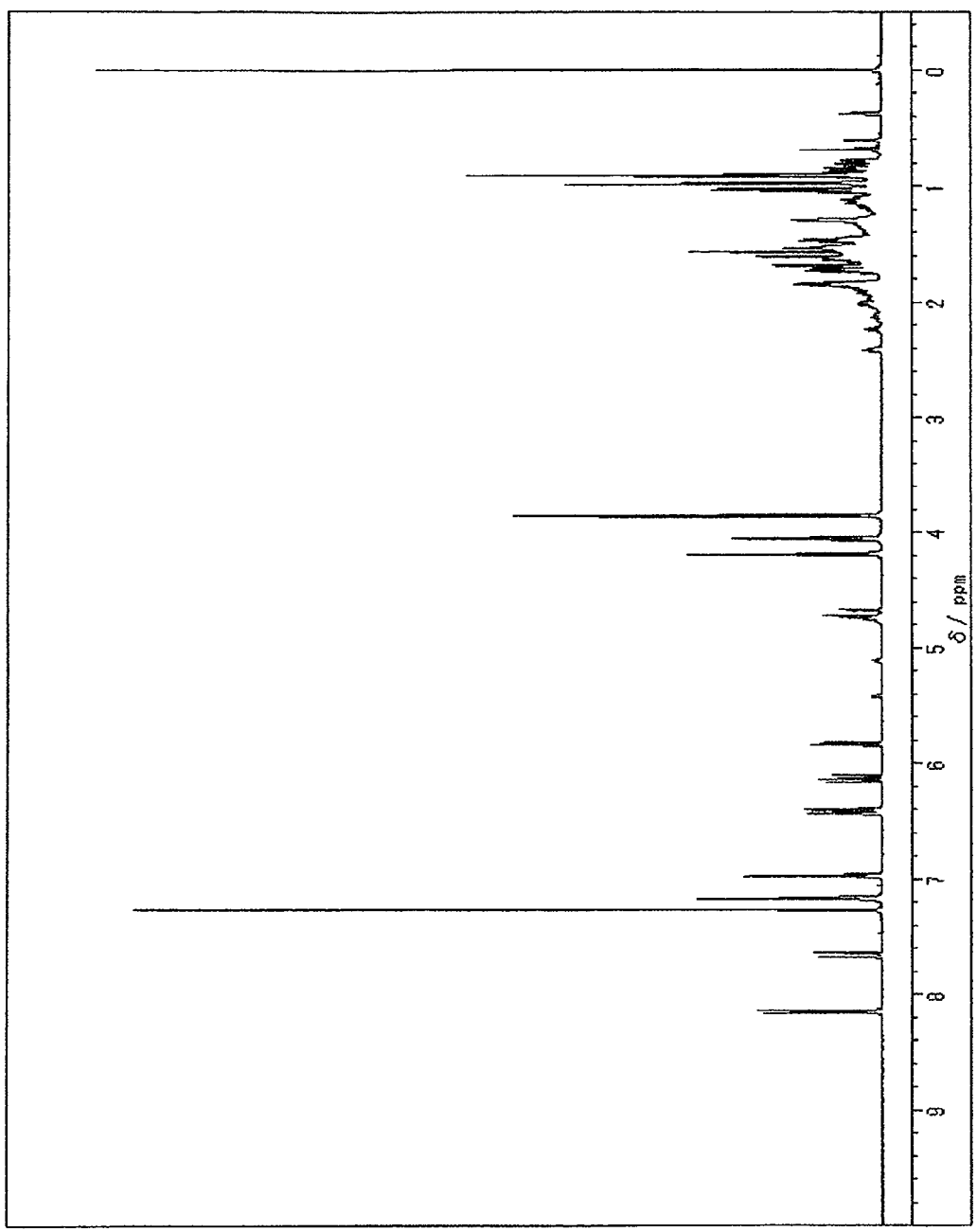
FIG. 1 is a $^1$H-NMR spectrum of the compound (A-1) obtained in Example 1.

The terms used herein are defined as follows. The term "liquid crystal compound" is a generic term for a compound having a liquid crystal phase and a compound having no liquid crystal phase but being useful as a component of a liquid crystal composition. A liquid crystal compound, a liquid crystal composition and a liquid crystal display device may be abbreviated as a compound, a composition and a device, respectively. A compound represented by Formula (1) may be abbreviated as a compound (1) or a compound of formula (1). The abbreviation rule may also be applied to a compound represented by Formula (2) and the like. The term "(meth)acrylate" may be used as a generic term for acrylate and methacrylate. In the chemical structural formulae, a symbol of a letter (such as A) surrounded by a hexagon represents a ringed group (ring A).

The term "arbitrary" used upon describing the structures of the chemical formulae includes not only an arbitrary position but also an arbitrary number, which are freely selected. For example, the expression "arbitrary A may be replaced by B, C, D or E" includes the meaning that one of A may be replaced by B, C, D or E and the meaning that all plural A may be replaced by one of B, C, D and E, and also includes the meaning that at least two of A replaced by B, A replaced by C, A replaced by D and A replaced by E may be present as mixture. In the case where arbitrary —$CH_2$— may be —O—, two groups of —$CH_2$— adjacent to each other are not replaced by —O—, and —$CH_2$— adjacent to —O— is not replaced by —O—.

The invention includes embodiments shown by the following items [1] to [25].

[1] A compound represented by formula (1):

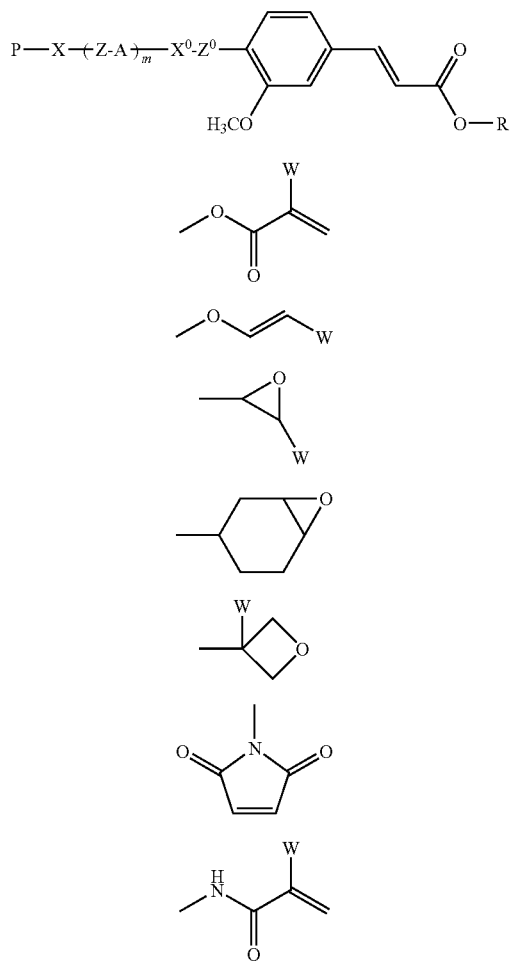

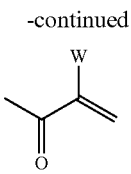

wherein A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —$CH_2CH_2$—, —$CH_2O$—, —$OCH_2$—, —$CF_2CF_2$—, —CH=CH—, —CF=CF—, —C≡C—, —$CF_2O$—, —$OCF_2$—, —$CH_2CH_2CF_2O$—, —$OCF_2CH_2CH_2$—, —$CH_2CH_2COO$—, —$OCOCH_2CH_2$—, —CH=CHCOO—, —OCOCH=CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; $X^0$ represents a single bond or alkylene having from 1 to 20 carbon atoms, and in the alkylene, arbitrary —$CH_2$— may be replaced by —O—, —S— or —CH=CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —$CH_2$— may be replaced by —O—, —S—, —COO—, —OCO— or —OCOO—, and arbitrary hydrogen may be replaced by fluorine; R represents a sterol moiety derived from vegetable organisms; P represents one of polymerizable groups represented by formulae (P1) to (P8), wherein W represents hydrogen, halogen, alkyl having from 1 to 3 carbon atoms or fluoroalkyl having from 1 to 3 carbon atoms.

[2] The compound according to the item [1], wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —$CH_2CH_2$—, —$CH_2O$—, —$OCH_2$—, —CH=CH—, —C≡C—, —$CH_2CH_2COO$—, —$OCOCH_2CH_2$—, —CH=CHCOO—, —OCOCH=CH—, —C≡CCOO— or —OCOC≡C—; $X^0$ represents a single bond or alkylene having from 1 to 20 carbon atoms, and in the alkylene, arbitrary —$CH_2$— may be replaced by —O—, —S— or —CH=CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —$CH_2$— may be replaced by —O—, —S—, —OCO—, —OCO— or —OCOO—, and arbitrary hydrogen may be replaced by fluorine; P represents one of groups represented by formulae (P1), (P6), (P7) and (P8); and R represents one of groups represented by formulae (Ory1) to (Ory6):

(Ory1)
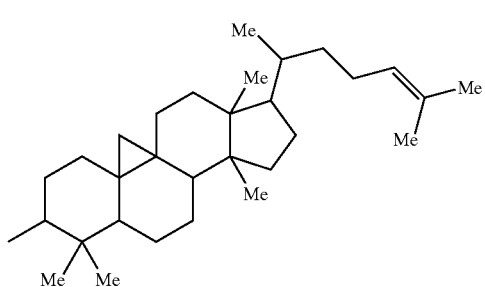

(Ory2)
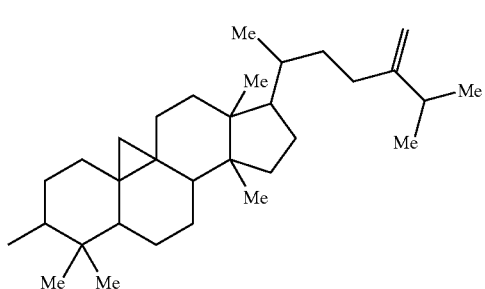

(Ory3)
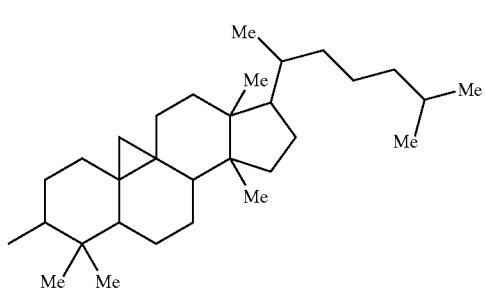

(Ory4)
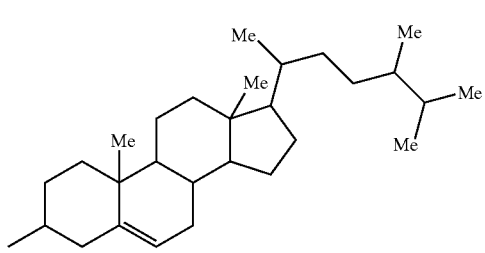

(Ory5)
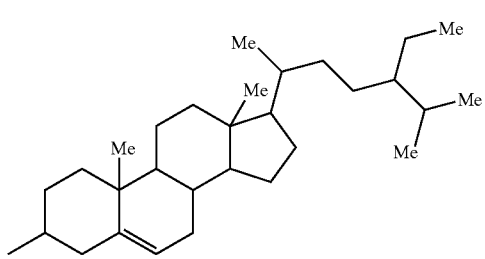

(Ory6)
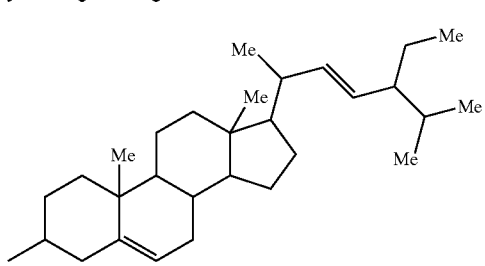

wherein Me represents methyl.

[3] The compound according to the item [1], wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO—, —OCOCH=CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH=CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; P represents one of groups represented by formulae (P3), (P4) and (P5); and R represents one of groups represented by formulae (Ory1) to (Ory6).

[4] The compound according to the item [1], wherein A represents 1,4-cyclohexylene or 1,4-phenylene, and arbitrary hydrogen of the rings may be replaced by fluorine, chlorine, methyl or trifluoromethyl; Z represents a single bond, —COO—, —OCO—, —CH$_2$CH$_2$—, —CH=CH—, —CH$_2$CH$_2$COO—, —OCOCH$_2$CH$_2$—, —CH=CHCOO— or —OCOCH=CH—; $X^0$ represents a single bond or alkylene having from 1 to 10 carbon atoms, and in the alkylene, arbitrary —CH$_2$— may be replaced by —O—, and arbitrary hydrogen may be replaced by fluorine; $Z^0$ represents —O— or —COO—; X represents a single bond or alkylene having from 1 to 10 carbon atoms, and in the alkylene, arbitrary —CH$_2$— may be replaced by —O—, —COO— or —OCO—, and arbitrary hydrogen may be replaced by fluorine; P represents one of polymerizable groups represented by formulae (P1), (P3) and (P5); W represents hydrogen, fluorine, chlorine, methyl, ethyl or trifluoromethyl; and R represents one of groups represented by formulae (Ory1) to (Ory6) according to the item 2.

[5] A compound represented by formula (1-m):

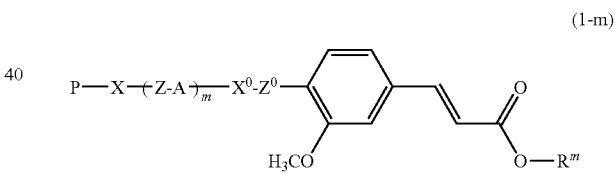

(1-m)

wherein A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CF$_2$CF$_2$—, —CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; $X^0$ represents a single bond or alkylene having from 1 to 20 carbon atoms, and in the alkylene, arbitrary —CH$_2$— may be replaced by —O—, —S— or —CH=CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —$CH_2$— may be replaced by —O—, —S—, —COO—, —OCO— or —OCOO—, and arbitrary hydrogen may be replaced by fluorine; $R^m$ represents a sterol moiety derived from γ-oryzanol; and P represents one of polymerizable groups represented by formulae (P1) to (P8):

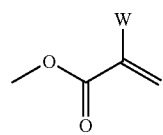
(P1)

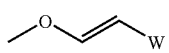
(P2)

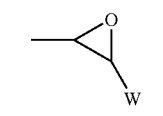
(P3)

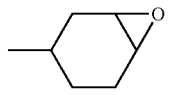
(P4)

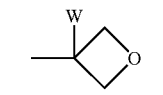
(P5)

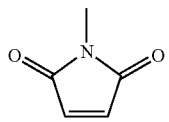
(P6)

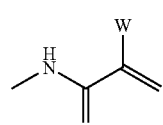
(P7)

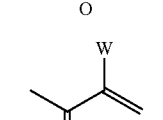
(P8)

wherein W represents hydrogen, halogen, alkyl having from 1 to 3 carbon atoms or fluoroalkyl having from 1 to 3 carbon atoms.

[6] The compound according to the item [5], wherein the compound is obtained by reacting a compound represented by formula (1-LC) and γ-oryzanol represented by (1-Ory):

$$P—X—(Z-A)_m—X^0—Y \quad \text{(1-LC)}$$

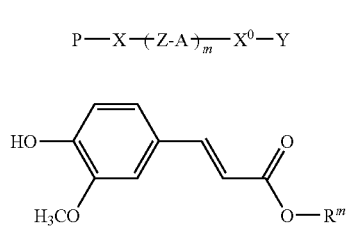
(1-Ory)

wherein, in formula (1-LC), A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —$CH_2CH_2$—, —$CH_2O$—, —$OCH_2$—, —$CF_2CF_2$—, —CH=CH—, —CF=CF—, —C≡C—, —$CF_2O$—, —$OCF_2$—, —$CH_2CH_2CF_2O$—, —$OCF_2CH_2CH_2$—, —$CH_2CH_2COO$—, —$OCOCH_2CH_2$—, —CH=CHCOO—, —OCOCH=CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; $X^0$ represents a single bond or alkylene having from 1 to 20 carbon atoms, and in the alkylene, arbitrary —$CH_2$— may be replaced by —O—, —S— or —CH=CH—, and arbitrary hydrogen may be replaced by fluorine; Y represents —OH, —COOH, —COCl or —OCOOH; X represents a single bond or alkylene having from 1 to 20 carbon atoms, and in the alkylene, arbitrary —$CH_2$— may be replaced by —O—, —S—, —COO—, —OCO— or —OCOO—, and arbitrary hydrogen may be replaced by fluorine; and P represents one of polymerizable groups represented by formulae (P1) to (P8):

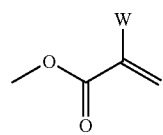
(P1)

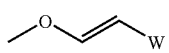
(P2)

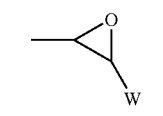
(P3)

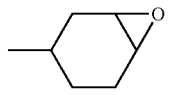
(P4)

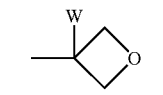
(P5)

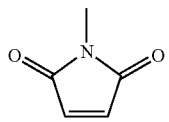
(P6)

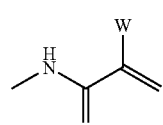
(P7)

(P8)

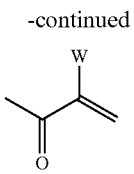

wherein W represents hydrogen, halogen, alkyl having from 1 to 3 carbon atoms or fluoroalkyl having from 1 to 3 carbon atoms, and $R'''$ in the formula (1-Ory) represents a sterol moiety derived from γ-oryzanol.

[7] The compound according to the item [5], wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; and P represents one of groups represented by formulae (P1), (P6), (P7) and (P8).

[8] The compound according to the item [5], wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —OCO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; and P represents one of groups represented by formulae (P3), (P4) and (P5).

[9] The compound according to the item [5], wherein A represents 1,4-cyclohexylene or 1,4-phenylene, and arbitrary hydrogen of the rings may be replaced by fluorine, chlorine, methyl or trifluoromethyl; Z represents a single bond, —OCO—, —OCO—, —OCOO—, —CH$_2$CH$_2$—, —CH═CH—, —CH$_2$CH$_2$COO—, OCOCH$_2$CH$_2$—, —CH═CHCOO— or —OCOCH═CH—; $X^0$ represents a single bond or alkylene having from 1 to 10 carbon atoms, and in the alkylene, arbitrary —CH$_2$— may be replaced by —O—, and arbitrary hydrogen may be replaced by fluorine; $Z^0$ represents —O— or —COO—; X represents a single bond or alkylene having from 1 to 10 carbon atoms, and in the alkylene, arbitrary —CH$_2$— may be replaced by —O—, —COO— or —OCO—, and arbitrary hydrogen may be replaced by fluorine; P represents one of polymerizable groups represented by formulae (P1), (P3) and (P5); and W represents hydrogen, fluorine, chlorine, methyl, ethyl or trifluoromethyl.

[10] The compound according to the item [9], wherein $Z^0$ represents —COO—; and X represents alkylene having from 1 to 10 carbon atoms, and in the alkylene, arbitrary —CH$_2$— may be —O—, but two groups of —CH$_2$— adjacent to each other are not replaced by —O—.

[11] A liquid crystal composition containing at least two compounds, and containing one of at least one of the compounds according to one of the items [1] to [4] and at least one of the compounds according to one of the items [5] to [10].

[12] The liquid crystal composition according to the item [11], wherein all the compounds constituting the liquid crystal composition are each a polymerizable liquid crystal compound.

[13] The liquid crystal composition according to the item [11], wherein the composition contains one of at least one of the compounds according to one of the items [1] to [4] and at least one of the compounds according to one of the items [5] to [10], and at least one polymerizable compound selected from the group consisting of compounds represented by formula (M1) and compounds represented by formula (M2), at least one of the compounds according to one of the items [1] to [4] or at least one of the compounds according to one of the items [5] to [10], is contained in an amount of from 0.1 to 99.9% by weight based on the total amount of the composition, and the polymerizable compound selected from the group consisting of compounds represented by formula (M1) and compounds represented by formula (M2) is contained in an amount of from 0.1 to 99.9% by weight based on the total amount of the composition:

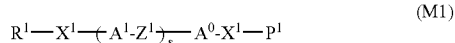
(M1)

(M2)

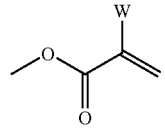
(P9)

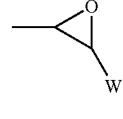
(P10)

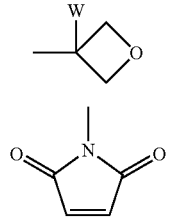
(P11)

(P12)

wherein $P^1$ independently represents one of polymerizable groups represented by formulae (P9) to (P12); W represents hydrogen, halogen, alkyl having from 1 to 3 carbon atoms or fluoroalkyl having from 1 to 3 carbon atoms; $R^1$ represents hydrogen, fluorine, chlorine, —CN or alkyl having from 1 to 20 carbon atoms, and in the alkyl, arbitrary —CH$_2$— may be replaced by —O—, —COO—, —OCO— or —OCOO—, and arbitrary hydrogen may be replaced by halogen; $A^0$ and $A^1$ each independently represents 1,4-cyclohexylene, 1,4-phenylene, 1,3-phenylene, pyridin-2,5-diyl, pyrimidin-2,5-diyl, naphthalen-2,6-diyl or fluoren-2,7-diyl, and arbitrary hydrogen of the rings may be replaced by halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by —O—, —COO—, —OCO— or —OCOO—; $Z^1$ independently represents a single bond, —OCO—, —OCO—, —OCOO—, —$CH_2CH_2$—, —CH=CH—, —$CH_2O$—, —$OCH_2$—, —$CF_2O$—, —$OCF_2$—, —CH=CHCOO— or —OCOCH=CH—; and s represents an integer of from 1 to 3, and when s is 2 or 3, plural groups represented by $A^1$ may be the same as or different from each other, and plural groups represented by $Z^1$ may be the same as or different from each other.

[14] The liquid crystal composition according to the item [13], wherein the polymerizable compounds selected from the group consisting of the compounds represented by formulae (M1) and (M2) are compounds represented by formulae (M1a), (M1b), (M1c), (M2a), (M2b) and (M2c):

wherein $P^1$ represents one of polymerizable groups represented by formulae (P9) to (P12); $R^1$ represents hydrogen, fluorine, chlorine, —CN or alkyl having from 1 to 20 carbon atoms, and in the alkyl, arbitrary —$CH_2$— may be replaced by —O—, —COO—, —OCO— or —OCOO—, and arbitrary hydrogen may be replaced by halogen; ring $A^2$ independently represents 1,4-cyclohexylene or 1,4-phenylene; $W^1$ independently represents hydrogen, halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by —O—, —COO—, —OCO— or —OCOO—; p and q each independently represents 0 or 1; and n independently represents an integer of from 0 to 5.

[15] A polymer obtaining by polymerizing at least one of the compound according to one of the items [1] to [4].

[16] A polymer obtaining by polymerizing at least one of the compound according to one of the items [5] to [10].

[17] A polymer obtaining by polymerizing the composition according to one of the items [11] to [14].

[18] A molded article having optical anisotropy obtaining by orienting at least one of the compound according to one of the items [1] to [4], at least one of the compound according to one of the items [5] to [10] or the liquid crystal composition

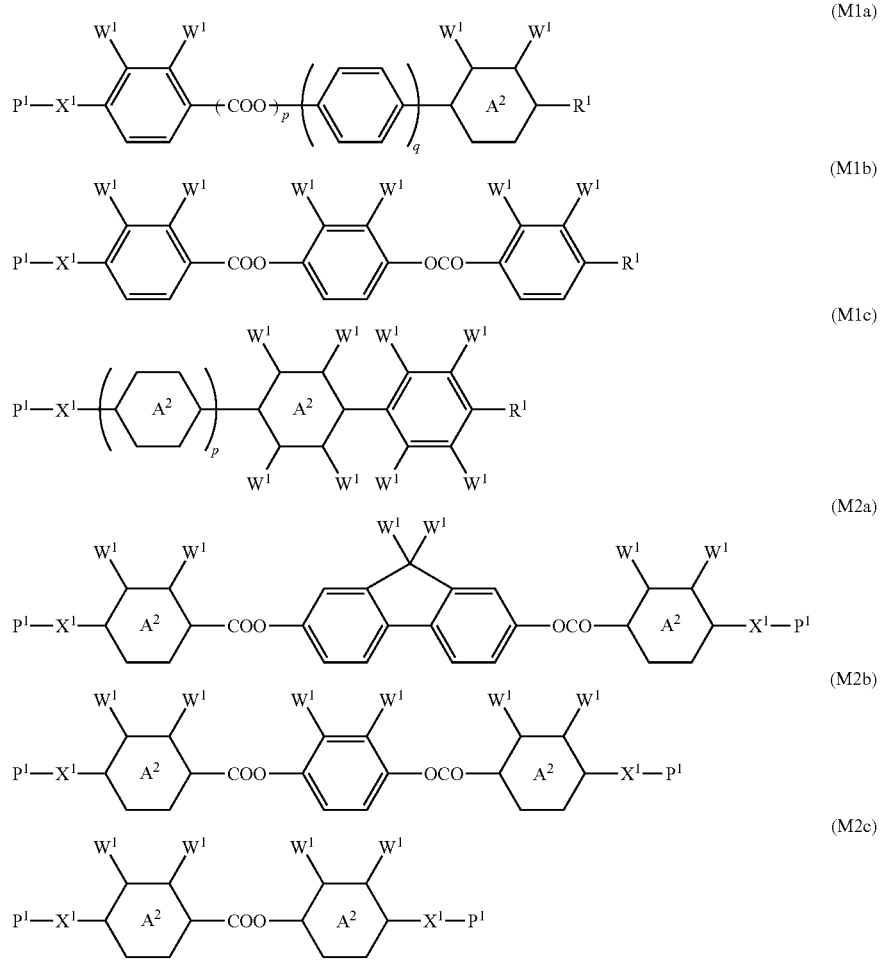

according to one of the items [11] to [14] applied on a substrate, polymerizing the compound or the composition by irradiating with an electromagnetic wave, and thereby immobilizing molecular orientation in a liquid crystal phase.

[19] The molded article according to the item [18], wherein the molecular orientation having been immobilized is twist orientation.

[20] An optical device containing the molded article according to the item [18] or [19].

[21] The optical device according to the item [20], wherein the optical device exhibits selective reflection.

[22] The optical device according to the item [21], wherein the optical device exhibits circularly polarized light dichroic property for light in a part or the whole region of a wavelength of from 350 to 750 nm.

[23] The optical device according to the item [21], wherein the optical device exhibits circularly polarized light dichroic property in an ultraviolet region of a wavelength of from 100 to 350 nm.

[24] A liquid crystal display device comprising at least one material selected from the group consisting of the compound according to one of the items [1] to [4], the compound according to one of the items [5] to [10], the composition according to one of the items [11] to [14], the polymer according to one of the items [15] to [17], the molded article according to the item [18] or [19], and the optical device according to one of the items [20] to [23].

[25] A film comprising the polymer according to one of the items [15] to [17].

The compound of the invention is represented by formula (1):

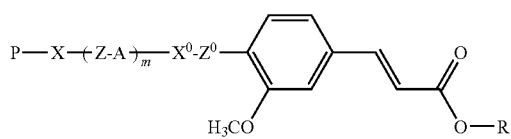
(1)

In formula (1), A is a divalent group having a cyclic structure. A independently represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and preferred examples of A include 1,4-cyclohexylene and 1,4-phenylene. In these rings, arbitrary hydrogen may be replaced by halogen, alkyl having from 1 to 3 carbon atoms or fluoroalkyl having from 1 to 3 carbon atoms.

Particularly preferred examples of A include 1,4-cyclohexylene, 1,4-phenylene and 1,4-phenylene, in which arbitrary hydrogen is replaced by fluorine, chlorine, methyl or trifluoromethyl. Specific examples thereof are shown below.

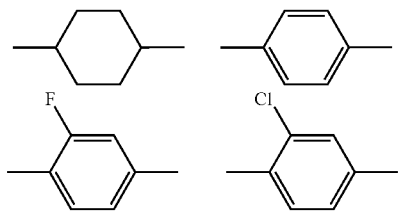

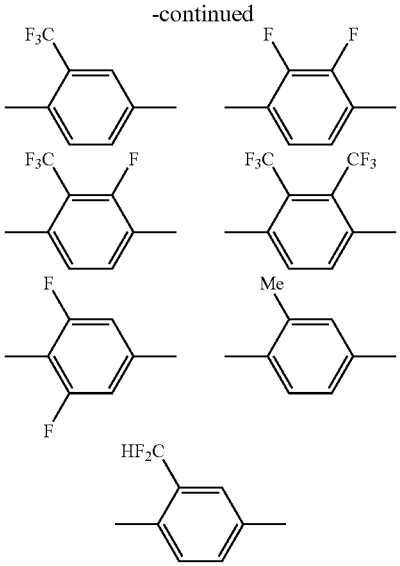
-continued

These rings may be bonded in formula (1) in the opposite direction to the above. The steric configuration of 1,4-cyclohexylene and 1,3-dioxan-2,5-diyl is preferably a trans configuration. The properties of the compound of the invention are not altered even in the case where the elements constituting the compound contain an isotope in such a proportion that is larger than the naturally occurring substances.

In formula (1), Z represents a bonding group. Z represents a single bond, —COO—, —OCO—, —OCOO—, —CH$_2$CH$_2$—, —CH$_2$O—, —OCH$_2$—, —CF$_2$CF$_2$—, —CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, CH=CHCOO—, —OCOCH=CH—, —C≡CCOO— or —OCOC≡C—. A single bond, —COO—, —OCO—, —CH$_2$CH$_2$—, —CH$_2$O—, —OCH$_2$—, —CH=CH—, —CH$_2$CH$_2$COO—, —OCOCH$_2$CH$_2$—, —CH=CHCOO—, and —OCOCH=CH— have a tendency of enhancing the liquid crystallinity. —CF$_2$CF$_2$—, —CF$_2$O—, —OCF$_2$—, —CH$_2$CH$_2$CF$_2$O—, and —OCF$_2$CH$_2$CH$_2$—, which each contains fluorine, have a tendency of decreasing the optical anisotropy or increasing the dielectric anisotropy. —C≡C—, —C≡CCOO— and —OCOC≡C—, which each contains a triple bond, have a tendency of inducing a large optical anisotropy. Preferred examples of Z include a single bond, —COO—, —OCO—, —OCOO—, —CH$_2$CH$_2$—, —CH$_2$O—, —OCH$_2$—, —C≡C—, —CH$_2$CH$_2$COO—, —OCOCH$_2$CH$_2$—, —CH=CHCOO— and —OCOCH=CH—. Particularly preferred examples of Z include a single bond, —COO—, —OCO—, —OCOO—, —CH$_2$CH$_2$—, —C≡C—, —CH$_2$CH$_2$COO—, —OCOCH$_2$CH$_2$—, —CH=CHCOO— and —OCOCH=CH—.

m represents an integer of from 0 to 3. m preferably represents an integer of from 0 to 2, and m particularly preferably represents 0 or 1. In the case where m is 2, two groups represented by A may be the same as or different from each other, and two groups represented by Z may be the same as or different from each other. The same is applied to the case where m is 3.

In formula (1), X represents a single bond or alkylene having from 1 to 20 carbon atoms, and in the alkylene, arbitrary —CH$_2$— may be replaced by —O—, —S—, —COO—, or —OCO—. Preferred examples of X include a single bond, —COO—, —OCO—, —OCOO— and alkylene having from 1 to 20 carbon atoms, and in the alkylene, arbitrary —CH$_2$— may be replaced by —O—. Particularly preferred examples of X include a single bond —COO—, —OCO—, —OCOO—, and alkylene having from 1 to 10 carbon atoms, that in the alkylene, arbitrary —CH$_2$— may be replaced by —O—. The group represented by X may have a branched structure. In the group represented by X, arbitrary hydrogen may be replaced by fluorine. In the case where X contains an asymmetric carbon atom, it may be a racemic substance or an optically active substance. In the case of an optically active substance, for preventing the HTP of the compound from being decreased, such a group is used that induces the same twist direction as the twist direction induced with the steroid structure. In the case where the HTP of the compound is controlled, such a group may be used that induces the opposite twist direction to the twist direction induced with the steroid structure.

In formula (1), $X^0$ represents a single bond or alkylene having from 1 to 20 carbon atoms. In the alkylene, arbitrary —CH$_2$— may be replaced by —O—, —S— or —CH=CH—, and arbitrary hydrogen may be replaced by fluorine. Preferred examples of $X^0$ include a single bond and alkylene having from 1 to 10 carbon atoms. In the alkylene having from 1 to 10 carbon atoms, arbitrary —CH$_2$— may be replaced by —O—, and arbitrary hydrogen may be replaced by fluorine.

In formula (1), $Z^0$ represents —O—, —COO— or —OCOO—. Preferred examples of $Z^0$ include —O— and —COO—, and a particularly preferred example of $Z^0$ is —COO—.

In formula (1), P represents one of polymerizable groups represented by formulae (P1) to (P8).

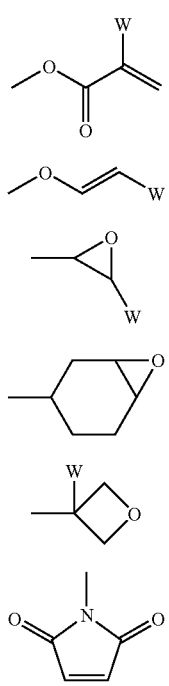

(P1)

(P2)

(P3)

(P4)

(P5)

(P6)

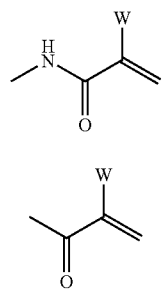

(P7)

(P8)

In formulae (P1) to (P8), W represents hydrogen, halogen, alkyl having from 1 to 3 carbon atoms or fluoroalkyl having from 1 to 3 carbon atoms. Preferred examples of W include hydrogen, fluorine, chlorine, methyl, ethyl and trifluoromethyl.

The polymerizable groups represented by formulae (P1), (P2), (P6), (P7) and (P8) are suitable for radical polymerization. The polymerizable groups represented by formulae (P3), (P4) and (P5) are suitable for cationic polymerization. Polymerization thereof can be performed rapidly by adding a polymerization initiator. Preferred examples of the polymerizable group represented by P include polymerizable groups represented by formulae (P1), (P3), (P5) and (P6), wherein W represents hydrogen, fluorine, chlorine, methyl, ethyl or trifluoromethyl. Particularly preferred examples of the polymerizable group represented by P include polymerizable groups represented by formulae (P1), (P3) and (P5), wherein W represents hydrogen, methyl or ethyl. Polymerization thereof can be performed rapidly by adding a polymerization initiator or by optimizing the reaction temperature.

In formula (1), R represents a sterol moiety derived from vegetable organisms. Preferred examples of the sterol moiety include groups represented by formulae (Ory1) to (Ory6).

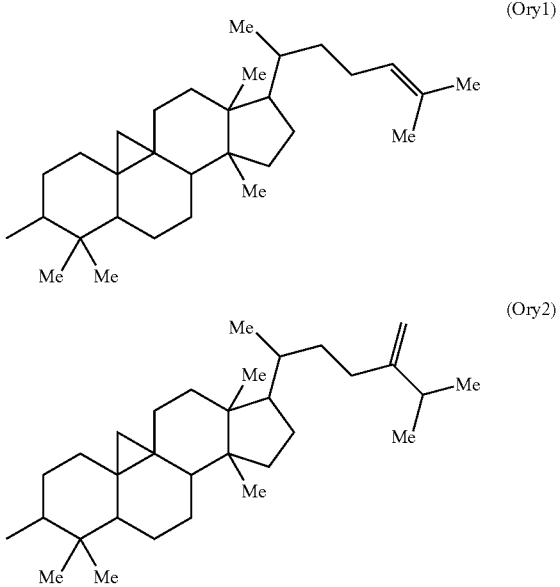

(Ory1)

(Ory2)

-continued

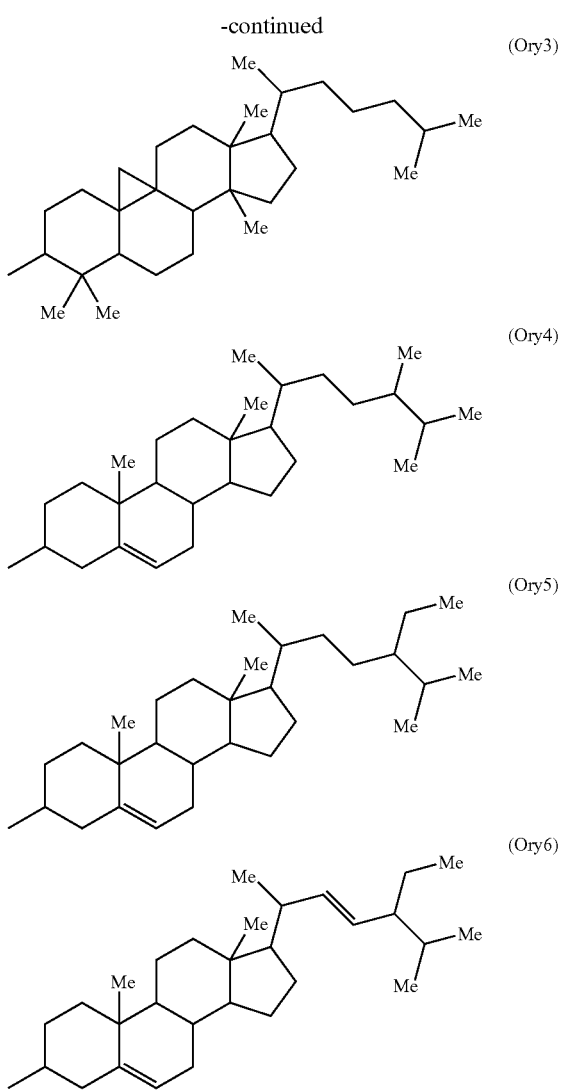

In formulae (Ory1) to (Ory6), Me represents methyl.

The ferulate ester of the groups is a major component of γ-oryzanol (CAS Registry Number: 11042-64-1), and can be isolated from γ-oryzanol, for example, in the manner described in J. of Agric. and Food Chem., vol. 47(7), pp. 2724-2728 (1999). For the purpose of the invention, however, it is not necessary to use the ferulate ester of the groups as a single compound, but a mixture of compounds having a polymerizable group and a sterol ferulate group, which is obtained from γ-oryzanol as a raw material, may be used as it is. The use of the mixture is preferred from the standpoint of economy. Accordingly, γ-oryzanol is preferably used as a raw material in the invention. γ-Oryzanol is available, for example, from Wako Pure Chemical Industries, Ltd., Tokyo Kasei Kogyo Co., Ltd., Tsukino Food Industrial Co., Ltd., Okayasu Shoten Co., Ltd., and the like. The major component of γ-oryzanol is a ferulate ester of a triterpen alcohol, representative examples of which include cycloartenol. The group represented by formula (Ory1) is a moiety obtained by removing the hydroxyl group from cycloartenol.

The compound (1-m) of the invention is a compound that has a polymerizable group and a sterol ferulate group, and is preferably obtained by reacting a compound having a liquid crystal skeleton represented by formula (1-LC) and γ-oryzanol represented by formula (1-Ory). However, the production method of the compound (1-m) of the invention is not limited to the method using γ-oryzanol, and the compound may be produced by other methods as far as a sterol moiety derived from γ-oryzanol can be introduced.

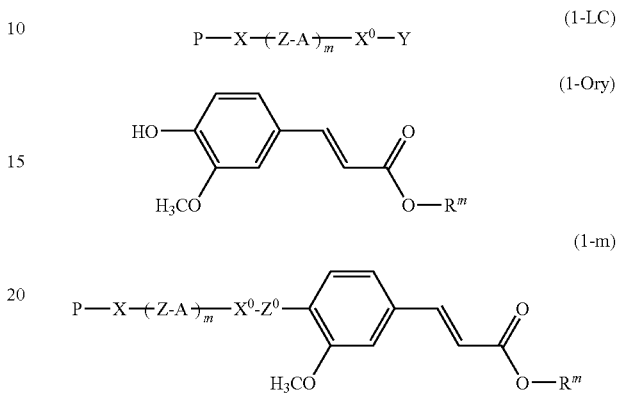

In formula (1-LC), the symbols P, X, Z, A, m and $X^0$ have the same meanings as those in formula (1), and Y represents —OH, —COOH, —COCl or —OCOOH. Accordingly, these are representative examples of a functional group that is capable of reacting with the hydroxyl group of ferulic acid. In formula (1-Ory), R represents a sterol moiety derived from γ-oryzanol, i.e., a group obtained by removing the hydroxyl group from sterol. The sterol moiety in γ-oryzanol is not a single group, as described above. Specifically, γ-oryzanol is a mixture of several kinds of sterol ferulate esters, and therefore the product obtained by reacting the compound (1-LC) and γ-oryzanol of formula (1-Ory) is a mixture of compounds each having a polymerizable group and a sterol ferulate group. Accordingly, the compound (1-m) is a mixture containing plural compounds. It is certainly expected that the compound (1-m) is a mixture that contains at least two compounds of the compounds represented by formulae (1-a) to (1-f) below.

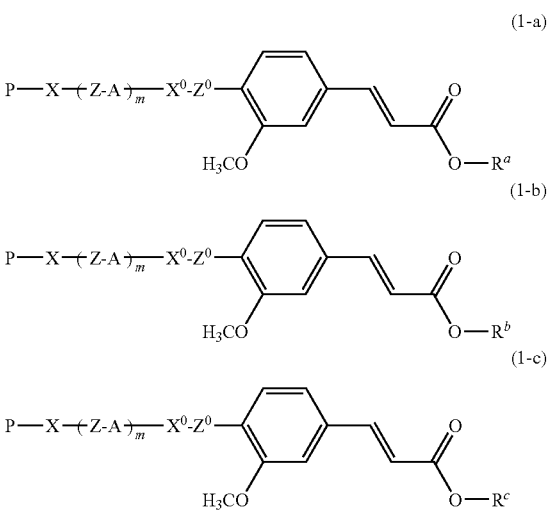

-continued

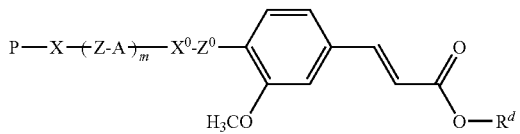
(1-d)

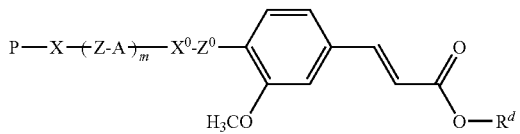
(1-e)

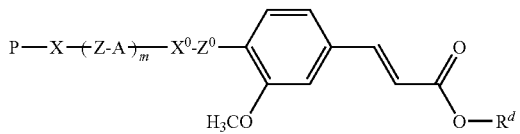
(1-f)

wherein, in formulae (1-a) to (1-f), $Z^0$ represents —O—, —COO— or —OCOO—; A, Z, $X^0$, X and P have the same meanings as in formula (1-LC); and m represents the same value as m in formula (1-LC).

$R^a$ in formula (1-a) represents the group represented by formula (Ory1); $R^b$ in formula (1-b) represents the group represented by formula (Ory2); $R^c$ in formula (1-c) represents the group represented by formula (Ory3); $R^d$ in formula (1-d) represents the group represented by formula (Ory4); $R^e$ in formula (1-e) represents the group represented by formula (Ory5); and $R^f$ in formula (1-f) represents the group represented by formula (Ory6).

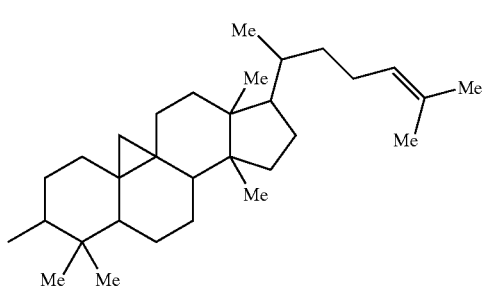
(Ory1)

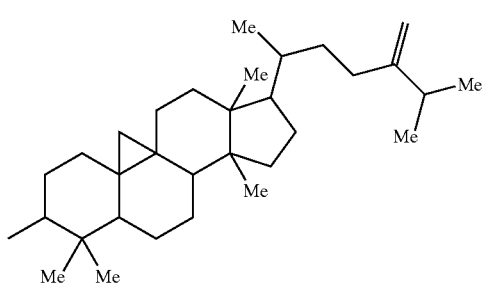
(Ory2)

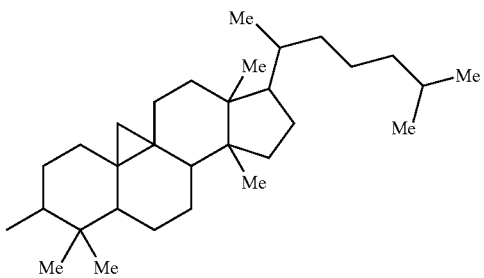
(Ory3)

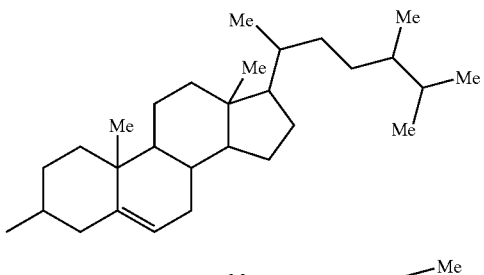
(Ory4)

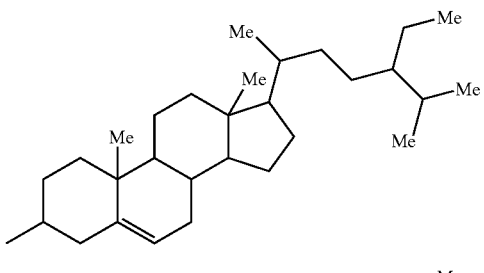
(Ory5)

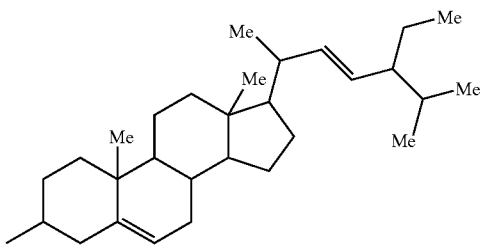
(Ory6)

wherein Me represents methyl.

It is understood from the above that the compound (1-m) of the invention is a preferred example of a mixture of the compounds (1) having different sterol moieties. In the following description, the term "compound (1)" is a generic term for a single compound represented by formula (1) and the compound (1-m) unless otherwise indicated. The compound (1) is polymerizable and optically active, and furthermore is well dissolved in other liquid crystal compounds and is hard to be crystallized in a liquid crystal composition at a low temperature, thereby exerting such functions as enhancement of the usable temperature range (temperature range of liquid crystal phase). Therefore, the compound (1) can be used for purposes utilizing the polymerizability thereof, and can also be used as a component of a liquid crystal composition used in a liquid crystal display device.

The production method of the compound (1) will be described. The polymerizable groups (P1) and (P7) can be introduced by acting an acrylic acid chloride to a liquid crystal moiety having a hydroxyl group and an amino group. The polymerizable group (P2) can be introduced by acting butyl vinyl ether to a liquid crystal moiety having a hydroxyl group to perform ether exchange reaction. The polymerizable groups (P3) and (P4) can be introduced by oxidizing a liquid crystal moiety having an unsaturated bond, and also by using a known intermediate having an oxirane ring and a cyclohexene oxide ring. The polymerizable group (P5) can be introduced by using a known intermediate having an oxetane ring, such as 3-alkyloxetan-3-yl methanol, which is industrially available. The polymerizable group (P6) can be introduced by acting maleic anhydride to a liquid crystal moiety having a hydroxyl group. The polymerizable group (P8) can be introduced by acting a β-chloropropionic acid chloride compound to a liquid crystal moiety having halogen, and then eliminating HCl. The liquid crystal moiety referred herein means $-X-(A-Z)_m-X^0-Z^0-$ in formula (1).

The other structure of the compound (1) than the polymerizable group can be produced by combining appropriately organic chemical synthesis methods disclosed in Houben-Wyle, Methoden der Organische Chemie (Georg-Thieme Verlag, Stuttgart), Organic Syntheses (John Wiley & Sons, Inc.), Organic Reactions (John Wiley & Sons, Inc.), Comprehensive Organic Synthesis (Pergamon Press) and the like. Specifically, the structure can be produced by bonding organic moieties having a 6-membered ring structure. The method for bonding the moieties will be described. In the following description, $MG^1$ and $MG^2$ each represents a monovalent organic moiety having at least one 6-membered ring structure, and may be the same as or different from each other.

Scheme 1 will be described. A compound (1A) that a single bond is synthesized by mixed coupling reaction of boronic acid (i1) and a bromide (i2). A compound (1B) having —COO— as the bonding group is synthesized by dehydration condensation reaction of a carboxylic acid (i3) and a compound (i4) having a hydroxyl group, and the carbonyl group is fluorinated with a fluoride anion to synthesize a compound (1C) having —CF$_2$O— as the bonding group. A compound (1D) having —CH$_2$O— as the bonding group is synthesized from a bromide (i5), a compound (i4) and a base (B$^-$). A compound (1E) having —CH=CH— as the bonding group is synthesized by performing Wittig reaction by acting an aldehyde (i7) to a yield obtained from a phosphonium salt (i6) and a base. The salt (i6) is synthesized by acting PPh$_3$ to a bromide (i5). A compound (1F) having —CH$_2$CH$_2$— as the bonding group is synthesized by reducing the compound (1E). A compound (1G) having —CF$_2$CF$_2$— as the bonding group is synthesized by fluorinating a diketone (i8) with a fluoride anion. The reaction proceeds in two steps, and therefore a compound (i9) having —CF$_2$CO— as the bonding group can be obtained by controlling the titer of the fluoride anion. A compound (1H) having —CF=CF— as the bonding group is synthesized by acting lithiated compounds (i10) and (i11) sequentially to tetrafluoroethylene. A compound (1J) having —C≡C— as the bonding group is synthesized by performing mixed coupling reaction of an alkine (i12) and a bromide (i2) in the presence of a transition metal catalyst.

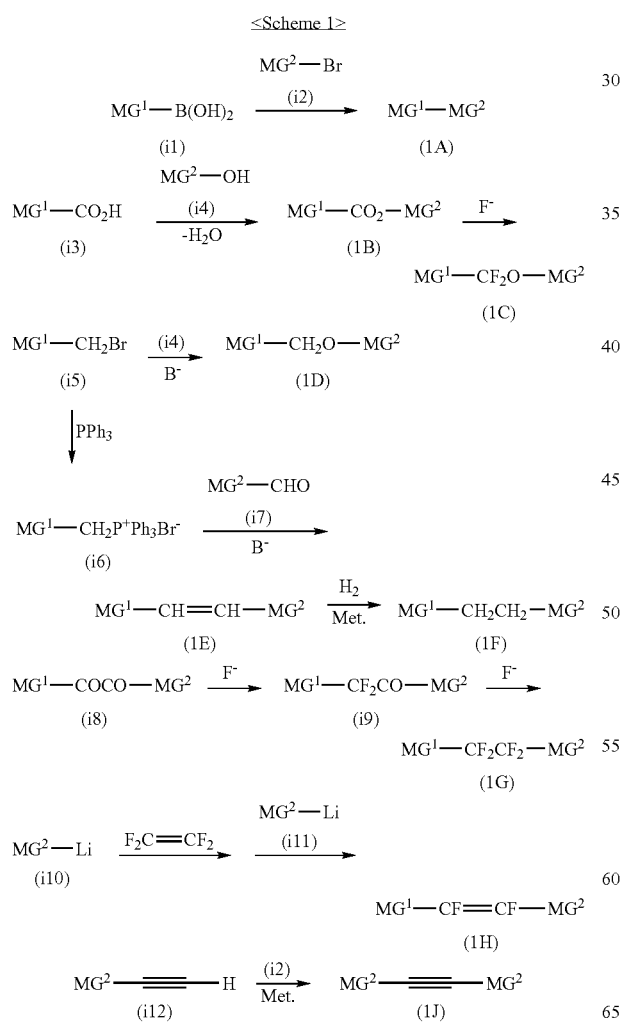

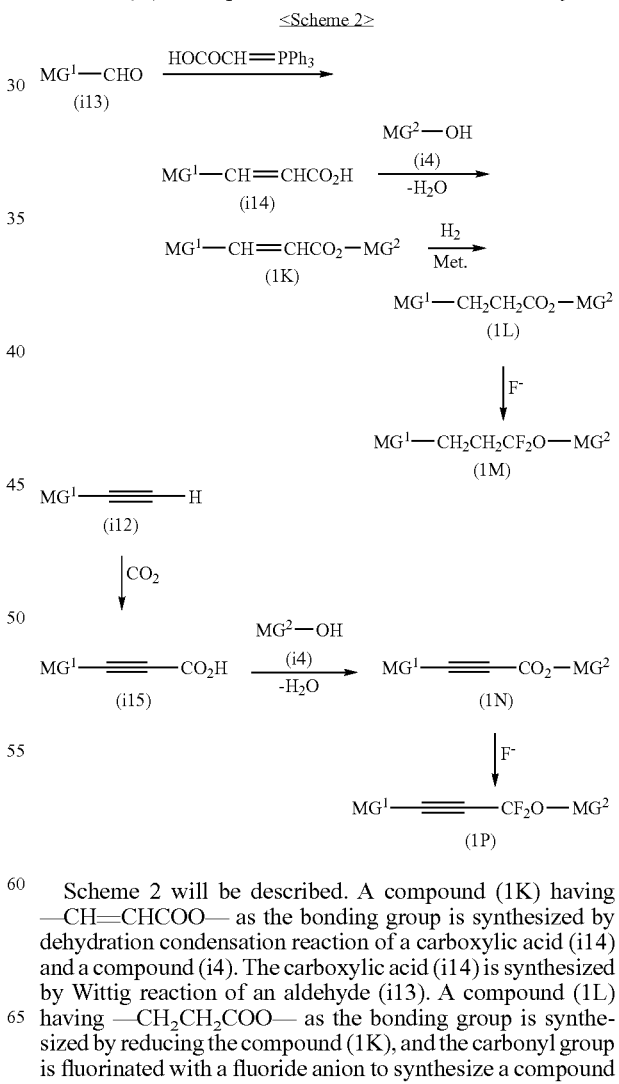

Scheme 2 will be described. A compound (1K) having —CH=CHCOO— as the bonding group is synthesized by dehydration condensation reaction of a carboxylic acid (i14) and a compound (i4). The carboxylic acid (i14) is synthesized by Wittig reaction of an aldehyde (i13). A compound (1L) having —CH$_2$CH$_2$COO— as the bonding group is synthesized by reducing the compound (1K), and the carbonyl group is fluorinated with a fluoride anion to synthesize a compound (1M) having —CH$_2$CH$_2$CF$_2$O— as the bonding group. A compound (1N) having —C≡CCOO— as the boding group is synthesized by dehydration condensation reaction of a carboxylic acid (i15) and a compound (i4). The carbonyl group is fluorinated with a fluoride anion to synthesize a compound (1P) having —C≡CCF$_2$O— as the bonding group. The carboxylic acid (i15) is synthesized by lithiating an alkine (i12) and acting CO$_2$ thereto.

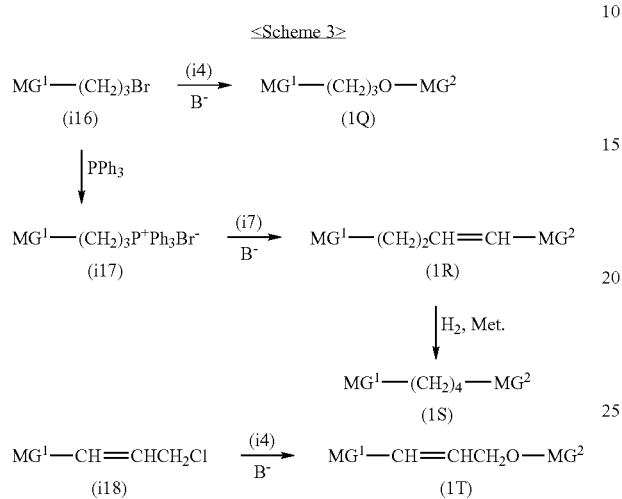

Scheme 3 will be described. A compound (1Q) having —(CH$_2$)$_3$O— as the bonding group is synthesized from a bromide (i16), a compound (i4) and a base. A compound (1R) having —(CH$_2$)$_2$CH═CH— as the bonding group is synthesized by performing Wittig reaction by acting an aldehyde (i7) to a yield obtained from a phosphonium salt (i17) and a base. A compound (1S) having —(CH$_2$)$_4$— as the bonding group is synthesized by reducing the compound (1R). The salt (i17) is synthesized by acting PPh$_3$ to a bromide (i16). A compound (1T) having —CH═CHCH$_2$O— as the bonding group is synthesized from a chloride (i18), a compound (i4) and a base.

The direction of the helix of the compound (1) or a composition containing the compound is not limited, and a circularly polarized light separating device produced therefrom selectively reflects anticlockwise circularly polarized light or clockwise circularly polarized light depending on the direction of the helix.

Specific examples of the preferred compounds synthesized by the aforementioned methods include compounds (1-1) to (1-14), (2-1) to (2-14), (3-1) to (3-12) and (4-1) to (4-14) shown below. In these compounds, the group Ory is a sterol moiety derived from γ-oryzanol having the meaning described above. In the benzene ring and the cyclohexane ring, hydrogen may be replaced by halogen or alkyl or fluoroalkyl each having from 1 to 3 carbon atoms. In the compounds, r represents an integer of from 1 to 20, and W has the same meaning as mentioned in the item (1).

(1-1)

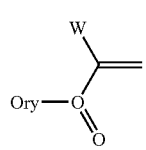

-continued (1-2)

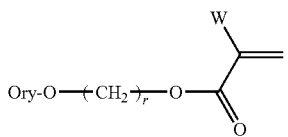

(1-3)

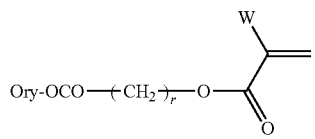

(1-4)

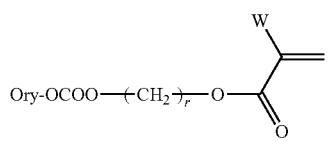

(1-5)

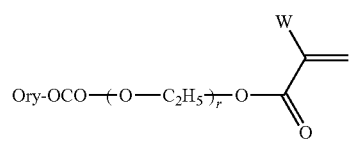

(1-6)

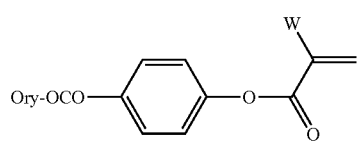

(1-7)

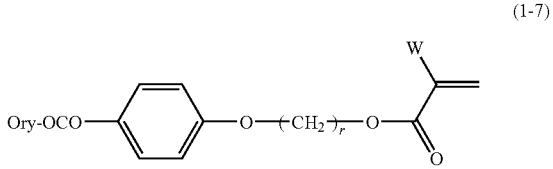

(1-8)

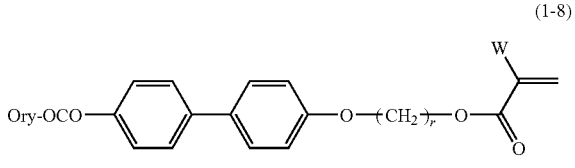

(1-9)

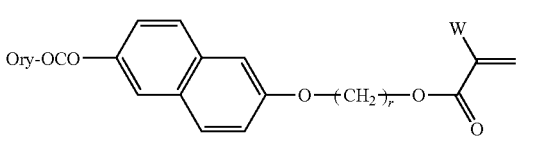

(1-10)

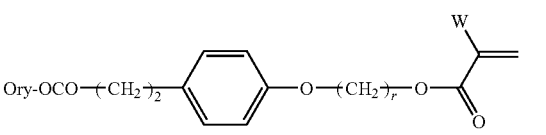

(1-11)

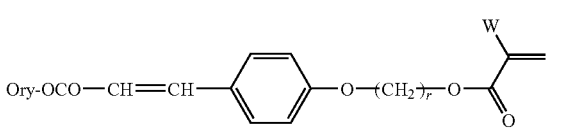

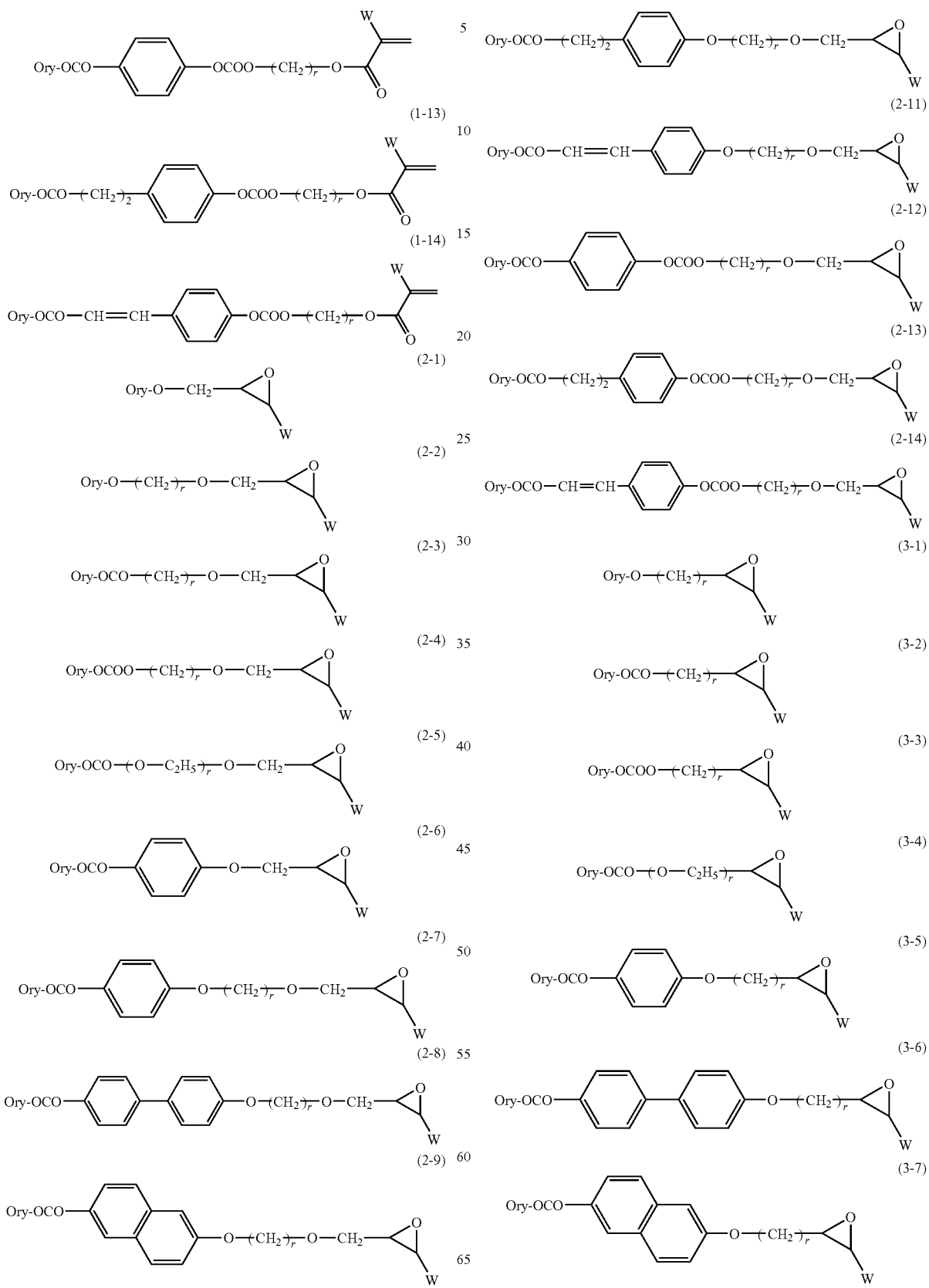

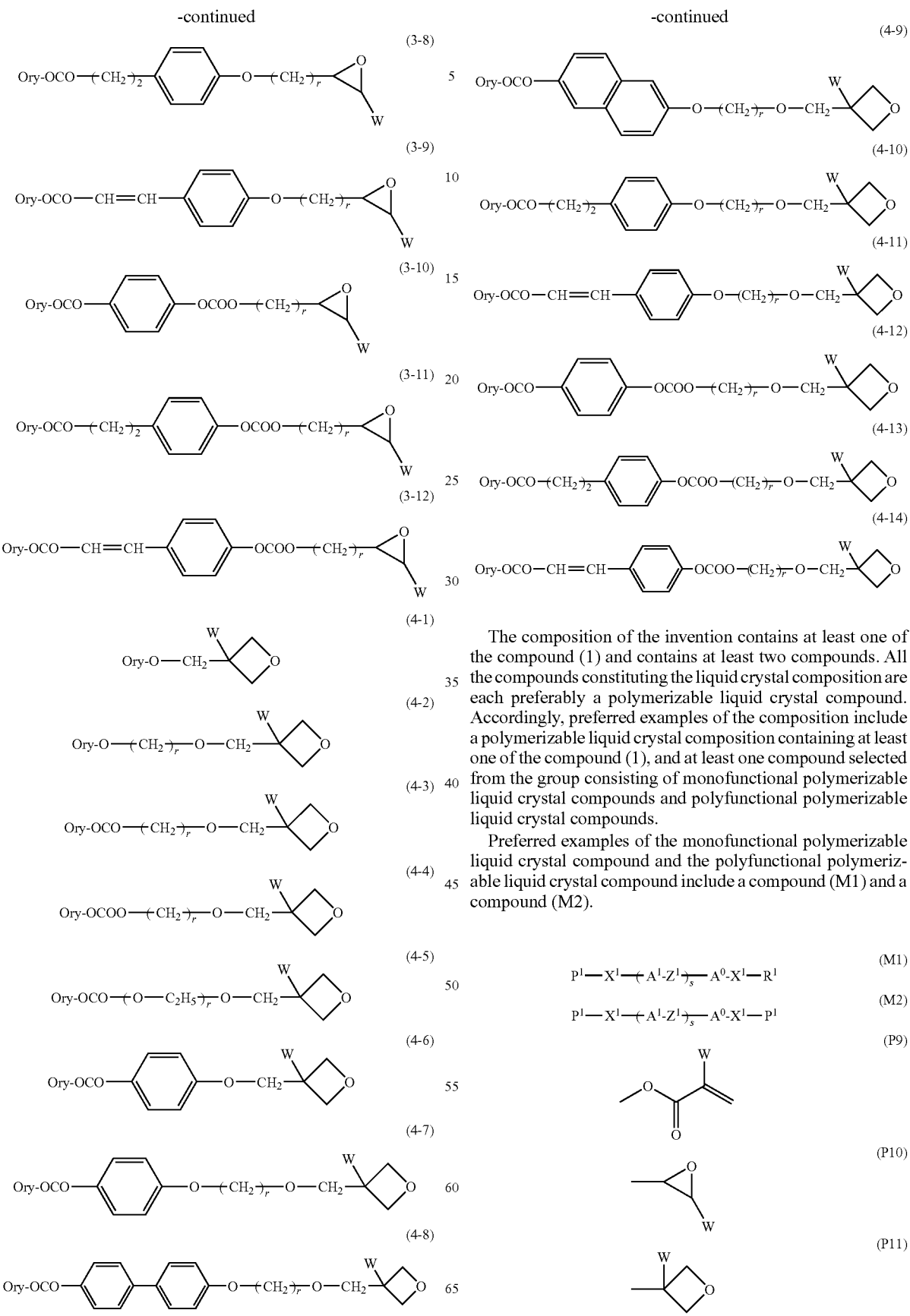

The composition of the invention contains at least one of the compound (1) and contains at least two compounds. All the compounds constituting the liquid crystal composition are each preferably a polymerizable liquid crystal compound. Accordingly, preferred examples of the composition include a polymerizable liquid crystal composition containing at least one of the compound (1), and at least one compound selected from the group consisting of monofunctional polymerizable liquid crystal compounds and polyfunctional polymerizable liquid crystal compounds.

Preferred examples of the monofunctional polymerizable liquid crystal compound and the polyfunctional polymerizable liquid crystal compound include a compound (M1) and a compound (M2).

$$P^1\text{—}X^1\text{—}(A^1\text{-}Z^1)_s\text{—}A^0\text{-}X^1\text{—}R^1 \quad (M1)$$

$$P^1\text{—}X^1\text{—}(A^1\text{-}Z^1)_s\text{—}A^0\text{-}X^1\text{—}P^1 \quad (M2)$$

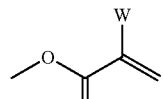 (P9)

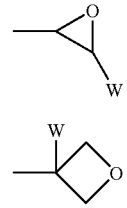 (P10)

(P11)

-continued

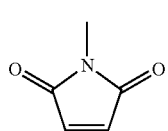
(P12)

wherein $P^1$ independently represents one of polymerizable groups represented by formulae (P9) to (P12); W represents hydrogen, halogen, alkyl having from 1 to 3 carbon atoms or fluoroalkyl having from 1 to 3 carbon atoms; $R^1$ represents hydrogen, fluorine, chlorine, —CN or alkyl having from 1 to 20 carbon atoms, and in the alkyl, arbitrary —$CH_2$— may be —O—, —COO—, —OCO— or —OCOO—; $Z^1$ independently represents a single bond, —COO—, —OCO—, —OCOO—, —$CH_2CH_2$—, —CH=CH—, —C≡C—, —$CH_2O$—, —$OCH_2$—, —$CF_2O$—, —$OCF_2$—, —CH=CHCOO— or —OCOCH=CH—; and s represents an integer of from 1 to 3, and when s is 2 or 3, plural groups represented by $A^1$ may be the same as or different from each other, and plural groups represented by $Z^1$ may be the same as or different from each other.

Preferred examples of the compounds (M1) and (M2) include compounds represented by formulae (M1a), (M1b), (M1c), (M2a), (M2b) and (M2c). The content of the compounds (M1a) to (M2c) is preferably from 0.1 to 99.9% by weight, and more preferably from 10 to 95% by weight, based on the total amount of the composition.

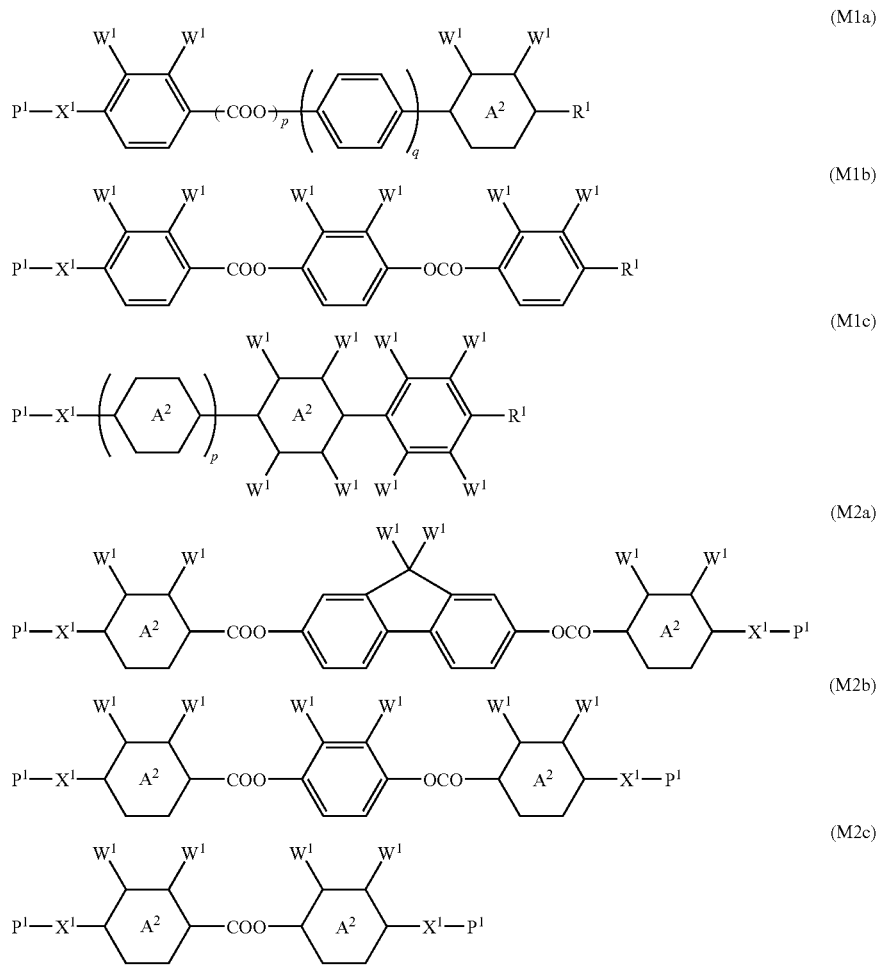

replaced by —O—, —COO—, —OCO— or —OCOO—, and arbitrary hydrogen may be replaced by halogen; $A^0$ and $A^1$ each independently represents 1,4-cyclohexylene, 1,4-phenylene, 1,3-phenylene, pyridin-2,5-diyl, pyrimidin-2,5-diyl, naphthalen-2,6-diyl or fluoren-2,7-diyl, and arbitrary hydrogen of the rings may be replaced by halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by wherein $P^1$ represents one of polymerizable groups represented by formulae (P9) to (P12); $R^1$ represents hydrogen, fluorine, chlorine, —CN or alkyl having from 1 to 20 carbon atoms, and in the alkyl, arbitrary —$CH_2$— may be replaced by —O—, —OCO—, —OCO— or —OCOO—, and arbitrary hydrogen may be replaced by halogen; ring $A^2$ independently represents 1,4-cyclohexylene or 1,4-phenylene; $W^1$ independently represents hydrogen, halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by —O—, —OCO—, —OCO— or —OCOO—; p and q each independently represents 0 or 1; and n independently represents an integer of from 0 to 5.

For enhancing the properties of the composition of the invention, the composition may contain additives, such as a non-polymerizable liquid crystal compound, a non-liquid crystal polymerizable compound, a polymerization initiator, a solvent, a surfactant, an antioxidant, a filler, an ultraviolet ray absorbent and a sensitizer. The additives are not particularly limited in chemical structure and formulation. The contents of the components may be such an extent that does not impair the liquid crystallinity of the composition. Examples of the non-polymerizable liquid crystal compound include compounds disclosed in the database, LiqCryst (a trade name by LCI Publisher, Hamburg, Germany) and references cited therein.

For optimizing the characteristics of the composition, an optically active compound other than the compound (1) may be added to the composition. Preferred examples of the optically active compound include compounds represented by formulae (Op-1) to (Op-25). In the formulae, Ak represents alkyl having from 1 to 15 carbon atoms or alkoxy having from 1 to 15 carbon atoms, and Me, Et and Ph each represents methyl, ethyl and phenyl, respectively. The polymerizable group $P^2$ is not limited as far as it has polymerizing function, and preferred examples thereof include polymerizable side chains containing a (meth)acryloyloxy moiety, a vinyloxy moiety, an oxiranyl moiety or an oxetanyl moiety. The composition of the invention can be used as a raw material of the polymer of the invention described later, and may be used directly as a constitutional component of a liquid crystal display device.

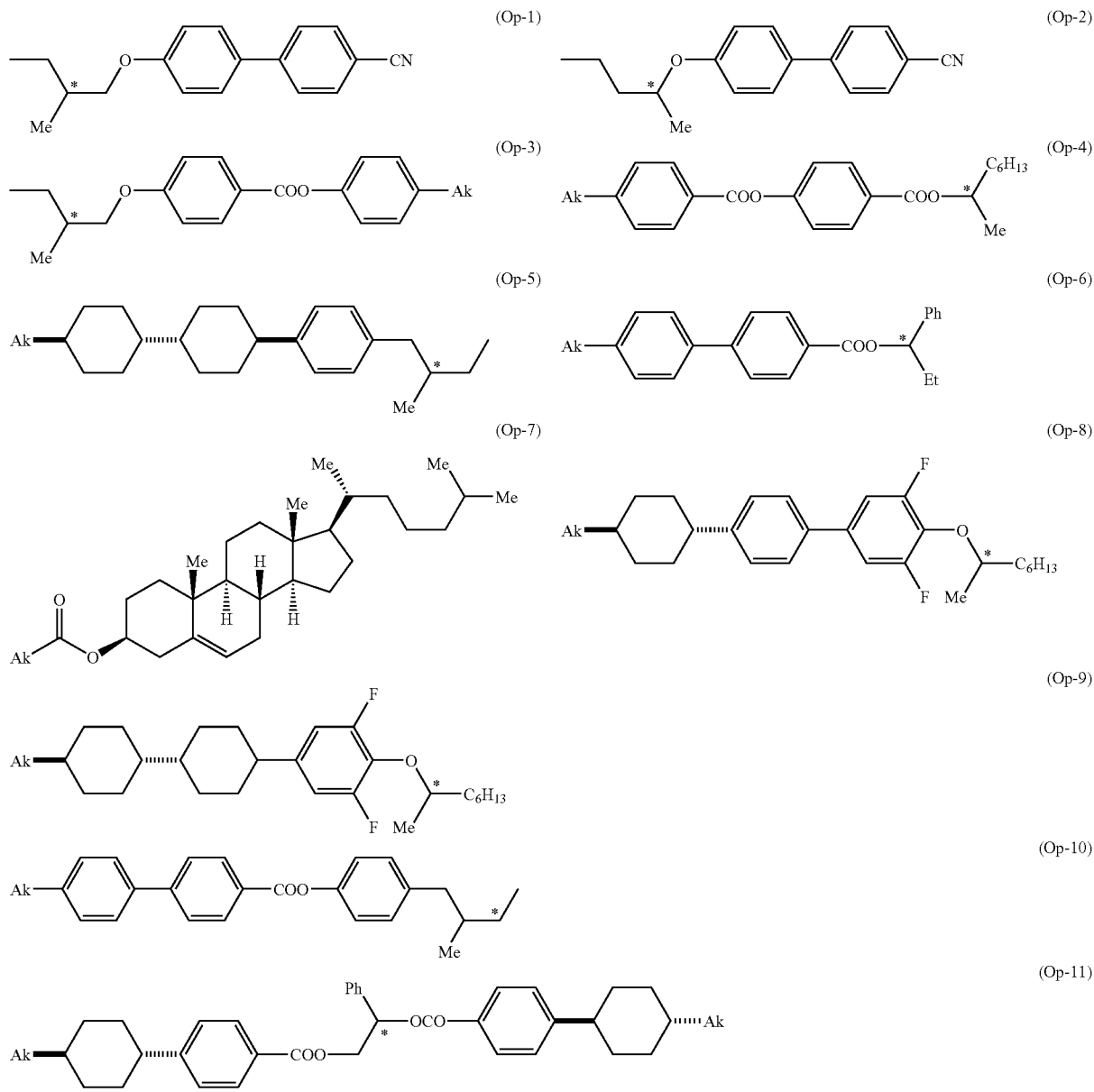

(Op-12)
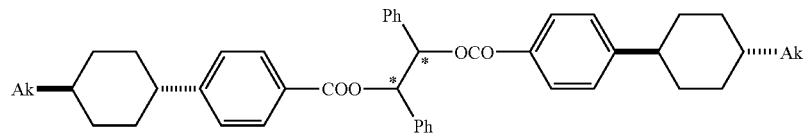
(Op-13)
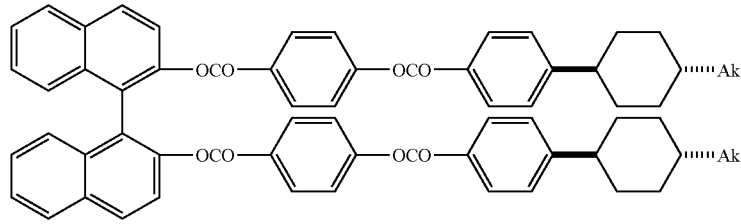
(Op-14)
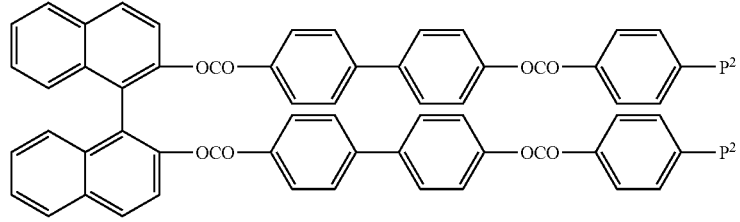
(Op-15) (Op-16)
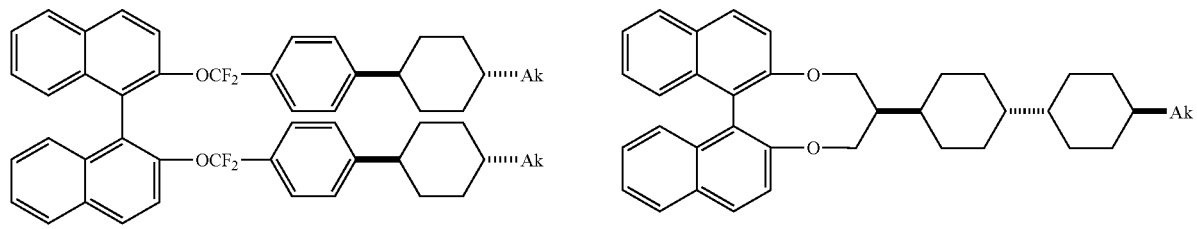
(Op-17)
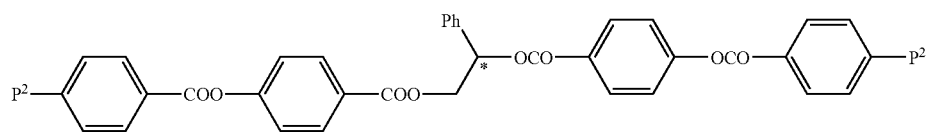
(Op-18)
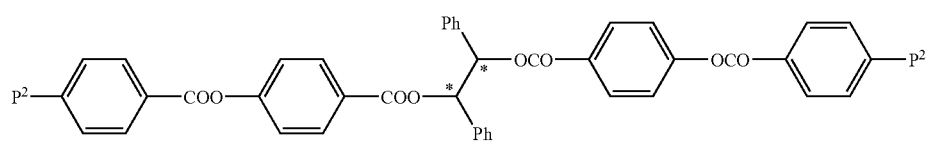
(Op-19)
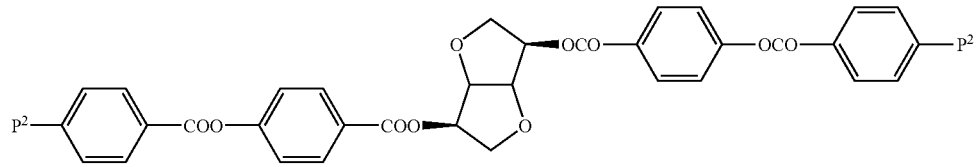
(Op-20)
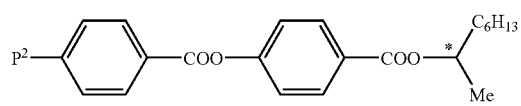
(Op-21)
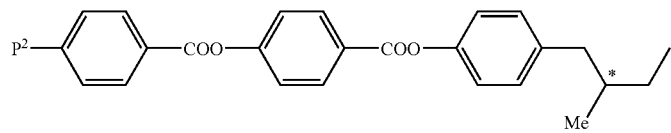

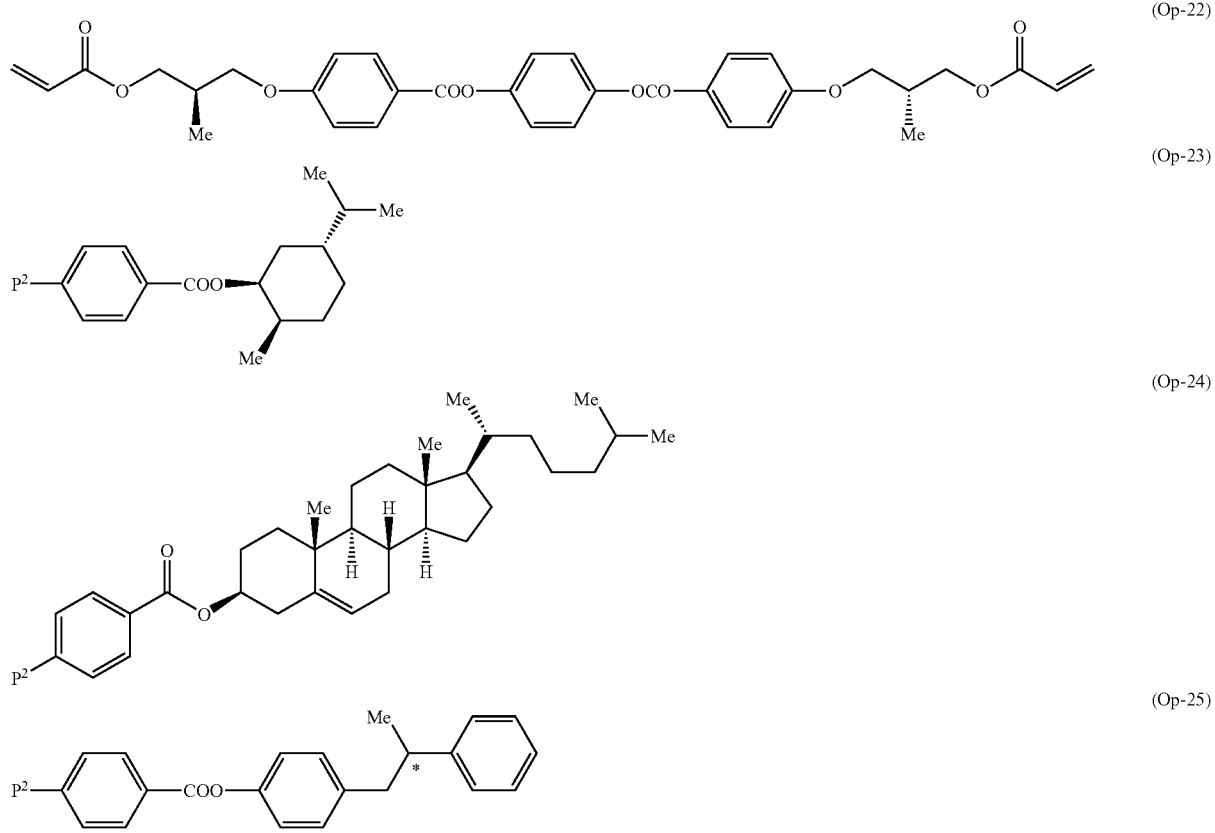

The polymer of the invention can be produced by radical polymerization or cationic polymerization of the compound (1) or a liquid crystal composition containing the compound. The polymer is a linear or side chain type polymer having a helical structure. A homopolymer is obtained by polymerizing only one of the compound (1). A copolymer is obtained by polymerizing composition having plural polymerizable compounds. Even in the case where the compound (1) is a mixture containing a group of compounds having different sterol moieties in formula (1), the polymer obtained therefrom is referred to as a homopolymer although it may be considered as a copolymer.

A polymerizable liquid crystal composition containing the compound (1) and a nematic liquid crystal composition has a cholesteric phase. A thin film of the composition is formed on a substrate by coating and is polymerized by irradiating with light, thereby providing a immobilized cholesteric phase (twist orientation), which can be utilized as a reflective polarizing plate, a nonlinear optical device and the like. A broad-band reflective polarizer can be produced by tilting the pitch in the direction perpendicular to the substrate. The tilting of the pitch can be performed by a skilled person in the art by referring to techniques in known publications.

Polymerization may be performed by irradiating energy (electromagnetic wave). The electromagnetic wave includes an ultraviolet ray, an infrared ray, a visible ray, an X-ray, a γ-ray and the like. The irradiation may be performed with a high-energy particle ray, such as ion and electron.

A polymerizable compound having no liquid crystallinity may be added for controlling the mechanical strength, the thermal strength, the coating property, the orientation property and the like. Preferred examples of the non-liquid crystal polymerizable compound include a (meth)acrylate compound, a vinyl compound, a styrene compound, a vinyl ether compound, an oxirane compound and an oxetane compound. A polyfunctional compounds, such as an acrylate, a vinyl ether, oxirane and oxetane, may be added for enhancing the mechanical strength and the thermal strength of the polymer.

A surfactant may be added to the composition of the invention for facilitating the coating operation and for controlling the orientation of the liquid crystal. The amount of the surfactant added varies depending on the kind of the surfactant and the effect expected from the addition thereof, and is preferably from 100 ppm to 10% by weight, and more preferably from 100 ppm to 5% by weight based on the liquid crystal composition of the invention.

Examples of the photoradical polymerization initiator include, in terms of specific trade names, Darocure TPO, 1173 and 4265, and Irgacure 184, 369, 500, 651, 784, 819, 907, 1300, 1700, 1800, 1850 and 2959, available from Ciba Specialty Chemicals, Inc., and any known initiator may be used.

Other examples of the photoradical polymerization initiator include 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-[4-(methylthio)phenyl]-2-morpholinopropan-1-one, a mixture of 2,4-diethylxanthone and methyl p-dimethylaminobenzoate, and a mixture of benzophenone and methyltriethanolamine, and any known initiator may be used.

Examples of photocationic polymerization initiator include, in terms of specific trade names, Cyracure UVI-6990 and Cyracure UVI-6974, available from Union Carbide Corporation, Adeka Optomer SP-150, SP-152, SP-170 and SP-172, available from Adeka Corporation, Photoinitiator 2074, available from Rhodia, Inc., Irgacure 250, available from Ciba Specialty Chemicals, Inc., and DTS-102, available from Midori Kagaku Co., Ltd., and any known initiator may be used.

The molded article of the invention can be produced in such a manner that the compound or the composition of the invention is applied on a substrate to form a thin film, which is polymerized by irradiating with an electromagnetic wave, such as light, to fix the nematic orientation formed by the composition in a liquid crystal state. Examples of the substrate include triacetyl cellulose, diacetyl cellulose, polyvinyl alcohol, polyimide, polyester, polyarylate, polyetherimide, polyethylene terephthalate, polyethylene naphthalate and polycarbonate. Specific examples thereof include, in terms of specific trade names, "Arton", available from JSR Corp., "Zeonex" and "Zeonoa", available from Zeon Corporation, and "APL", available from Mitsui Chemicals, Inc. The substrate may be a uniaxially stretched film or a biaxially stretched film. The substrate may be subjected to a surface treatment, such as a saponification treatment, a corona treatment and a plasma treatment, in advance.

The compound or the composition of the invention may be coated after dissolving in a solvent. Preferred examples of the solvent include hexane, heptane, toluene, xylene, methoxybenzene, ethylene glycol dimethyl ether, ethylene glycol monomethyl ether, ethylene glycol monomethyl ether acetate, propylene glycol monomethyl ether acetate, propylene glycol monoethyl ether acetate, acetone, methyl ethyl ketone, methyl isobutyl ketone, cyclopentanone, cyclohexanone, methyl acetate, ethyl acetate, γ-butyrolactone, 2-pyrrolidone, N-methyl-2-pyrrolidone, dimethylformamide, chloroform, dichloromethane, dichloroethane, t-butyl alcohol, diacetone alcohol, butyl cellosolve, and mixed solvents of them.

A stabilizer may be added to the compound or the composition of the invention for facilitating the handleability upon using and for preventing polymerization upon storing. Any known stabilizer may be used, and examples thereof include 4-ethoxyphenol, hydroquinone and 3,5-di-t-butyl-4-hydroxytoluene (BHT).

The compound or the composition of the invention can be coated in such a manner that the compound or the composition is coated by spin coating, roll coating, curtain coating, flow coating, printing, microgravure coating, gravure coating, wire bar coating, dip coating, spray coating, meniscus coating, flow cast coating or the like to form a thin film, and the solvent is removed therefrom.

The compound or the composition of the invention can be oriented on the substrate by subjecting the surface of the substrate to an orientation treatment before coating. Examples of the orientation treatment include a method of forming a thin film of polyimide, polyamide, polyvinyl alcohol or the like and then rubbing the thin film with a rayon cloth, a method of obliquely vapor-depositing silicon oxide, and a rubbing-free method, such as methods using a stretched film, an optical orientation film or an ion beam. In alternative, the substrate may be rubbed directly with a rayon cloth. There are some cases where the surface of the substrate may not be treated.

The orientation of the compound or the composition of the invention can be immobilized by irradiation of an electromagnetic wave. The wavelength of the electromagnetic wave is preferably in a range of from 150 to 500 nm, more preferably from 250 to 450 nm, and particularly preferably from 300 to 400 nm. The temperature upon irradiation is such a temperature that the compound or the composition is in a liquid crystal state, and is preferably 100° C. or less for preventing thermal polymerization from occurring. An optical device having a helical pitch selectively reflects clockwise or anticlockwise circularly polarized light. In the case where the wavelength of light to be reflected is from 350 to 750 nm, circularly polarized light in the visible region is selectively reflected. In the case where the wavelength of light to be reflected is from 100 to 350 nm, light in the visible region incident squarely is transmitted, thereby using the device as a negative C-plate. Accordingly, upon inserting the optical device between two polarizing plates forming crossed nicols, light incident squarely is not transmitted, but light incident obliquely is transmitted. The wavelength of reflected light is equal to the product of the refractive index and the helical pitch of the optical device, and thus the wavelength of selectively reflected light can be arbitrarily optimized by controlling the refractive index and the helical pitch of the optical device.

The composition of the invention containing an optically active compound exhibits a helical structure on a substrate. A molded article having twist orientation can be produced by polymerizing the composition. The molded article has the circularly polarized light separation function with respect to light having a wavelength λ that satisfies the equation, λ=(refractive index)×(pitch of helix). Accordingly, the molded article of the invention can be used as a luminance improving film in an optical device. The direction and the pitch of the helix can be optimized by appropriately selecting the species and the amount of the optically active compound added. Upon producing a negative C-plate, the wavelength of the selective reflection light is necessarily less than 350 nm. Accordingly, the helical pitch is preferably 1 nm or more and less than 200 nm, more preferably 10 nm or more and less than 200 nm, further preferably 50 nm or more and less than 200 nm, and particularly preferably 50 nm or more and less than 150 nm.

The thickness of the molded article of the invention varies depending on the demanded characteristics and the optical anisotropy of the molded article. The optical anisotropy is preferably from 0.05 to 50 µm, more preferably from 0.1 to 20 µm, and further preferably from 0.5 to 1 µm. The phase difference is preferably from 0.05 to 50 µm, more preferably from 0.1 to 20 µm, and further preferably from 0.5 to 10 µm. The haze value of the molded article is preferably 1.5% or less, and more preferably 1.0% or less. The transmittance of the molded article in the visible region is preferably 80% or more, and more preferably 85% or more. The haze value is preferably 1.5% or less for attaining sufficient polarizing capability. The transmittance is preferably 80% or more for maintaining brightness upon applying the molded article to a liquid crystal display device.

EXAMPLES

The invention will be described in more detail with reference to examples below. The chemical structures of the compounds synthesized were confirmed by $^1$H-NMR (Bruker Biospin Co. Ltd. DRX-500). HTP was obtained in such a manner that a composition containing a nematic liquid crystal, ZLI-1132, available from Merck & Co., Inc., and 1% by weight of the compound of the invention was prepared, and HTP was calculated by the Canot's wedge method. The optical thin film thus produced was measured with an infrared spectrophotometer (JASCO Corp. FT/IR-610). In the following description, liter as a unit of volume is shown by "L".

Example 1

Synthesis of Compound (A-1)

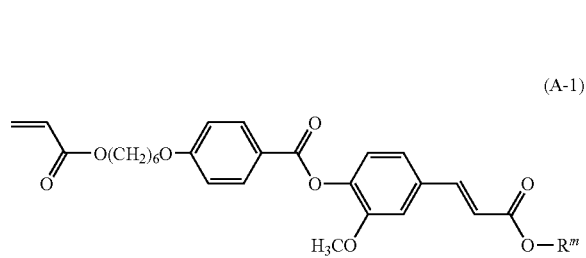

A mixture of γ-oryzanol (available from Wako Pure Chemical Industries, Ltd.) (5.0 g, 8.3 mmol), 4-(6-acryloyloxyhexyloxy)benzoic acid (2.5 g, 8.7 mmol), dicyclohexylcarbodiimide (1.8 g, 8.7 mmol), 4-dimethylaminopyridine (0.05 g, 0.4 mmol) and dichloromethane (100 mL) was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 300 mL, eluate: toluene/ethyl acetate (volume ratio: 19/1)) to provide 3.4 g of the compound (A-1) as a viscous solid (yield: 46%). The chemical structure thereof was confirmed by $^1$H-NMR (FIG. 1). HTP thereof was 3.1 (–μm). In the formula (A-1) above, $R'''$ represents a sterol moiety derived from γ-oryzanol.

Example 2

Synthesis of Compound (A-2)

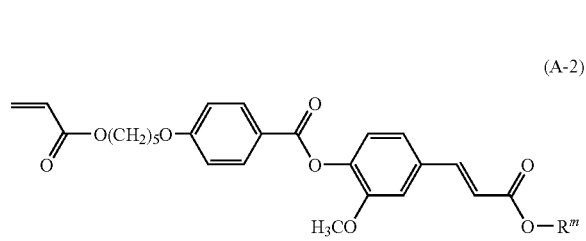

Figure 2:
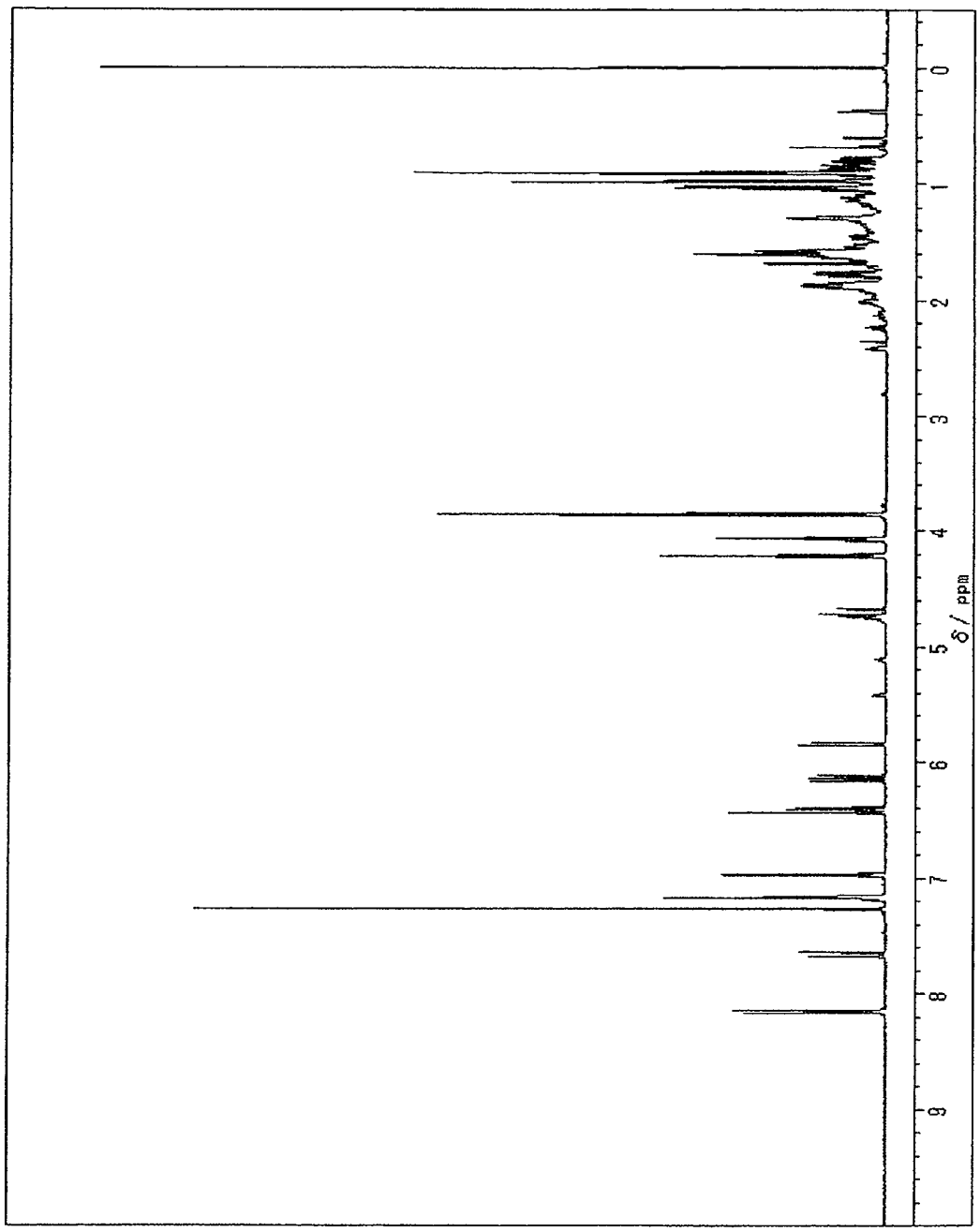
FIG. 2 is a $^1$H-NMR spectrum of the compound (A-2) obtained in Example 2.

A mixture of γ-oryzanol (available from Wako Pure Chemical Industries, Ltd.) (5.0 g, 8.3 mmol), 4-(5-acryloyloxypentyloxy)benzoic acid (2.4 g, 8.7 mmol), dicyclohexylcarbodiimide (1.8 g, 8.7 mmol), 4-dimethylaminopyridine (0.05 g, 0.4 mmol) and dichloromethane (100 mL) was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 300 mL, eluate: toluene/ethyl acetate (volume ratio: 19/1)) to provide 3.4 g of the compound (A-2) as a viscous solid (yield: 47%). The chemical structure thereof was confirmed by $^1$H-NMR (FIG. 2). HTP thereof was 3.5 (–μm). In the formula (A-2) above, $R'''$ represents a sterol moiety derived from γ-oryzanol.

Example 3

Synthesis of Compound (A-3)

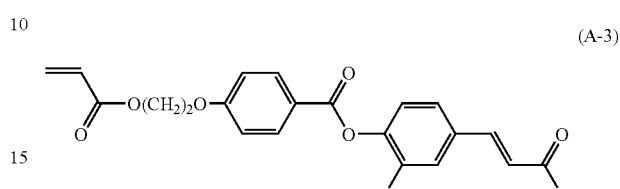

Figure 3:
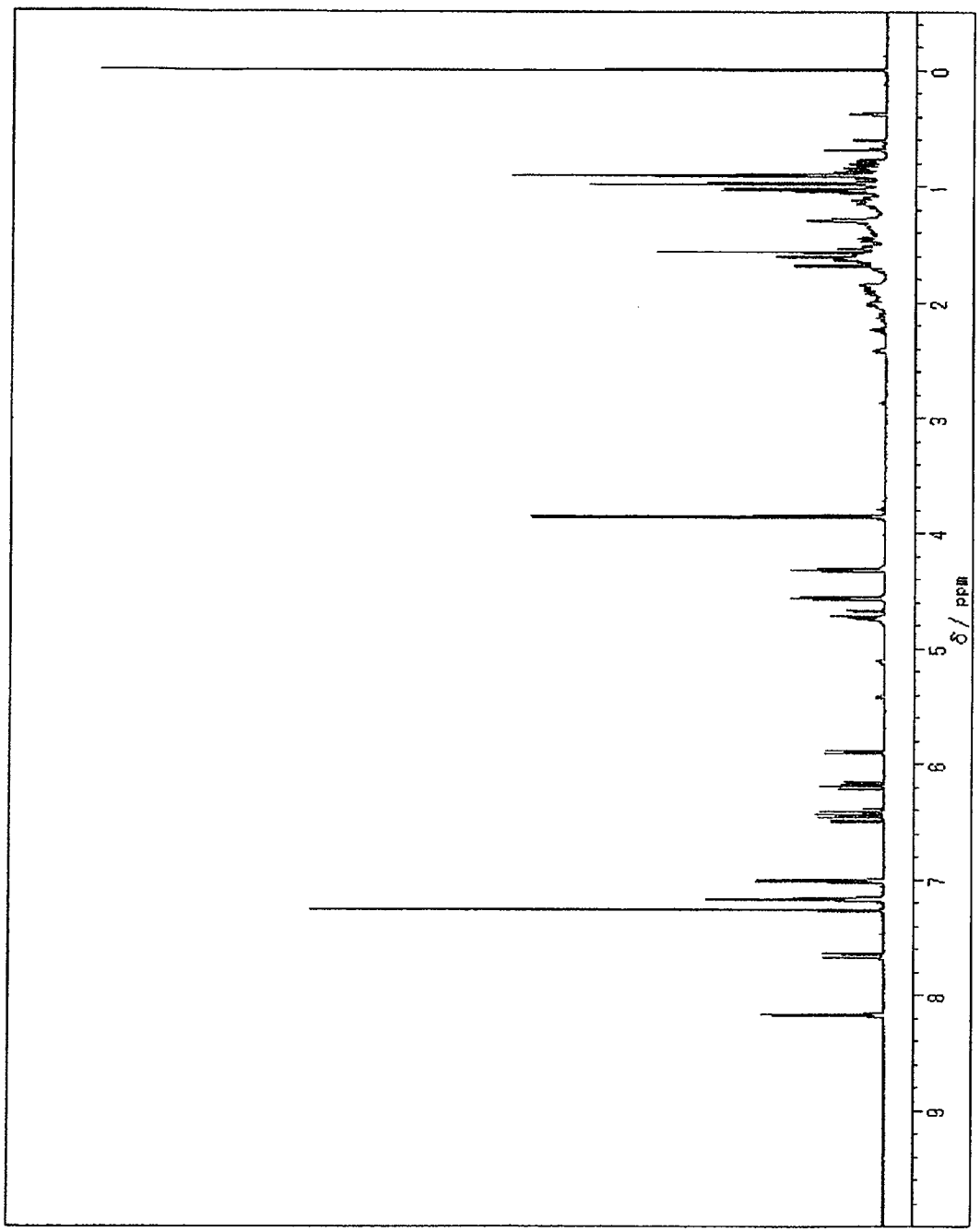
FIG. 3 is a $^1$H-NMR spectrum of the compound (A-3) obtained in Example 3.

A mixture of γ-oryzanol (available from Wako Pure Chemical Industries, Ltd.) (5.0 g, 8.3 mmol), 4-(2-acryloyloxyethyloxy)benzoic acid (2.1 g, 8.7 mmol), dicyclohexylcarbodiimide (1.8 g, 8.7 mmol), 4-dimethylaminopyridine (0.05 g, 0.4 mmol) and dichloromethane (100 mL) was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 300 mL, eluate: toluene/ethyl acetate (volume ratio: 19/1)) to provide 4.9 g of the compound (A-3) as colorless crystals (yield: 72%). The chemical structure thereof was confirmed by $^1$H-NMR (FIG. 3). HTP thereof was 4.1 (–μm). In the formula (A-3) above, $R'''$ represents a sterol moiety derived from γ-oryzanol.

Example 4

Synthesis of Compound (A-4)

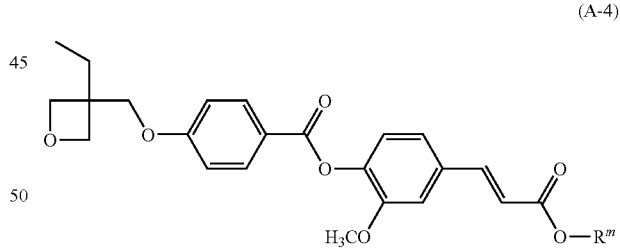

Figure 4:
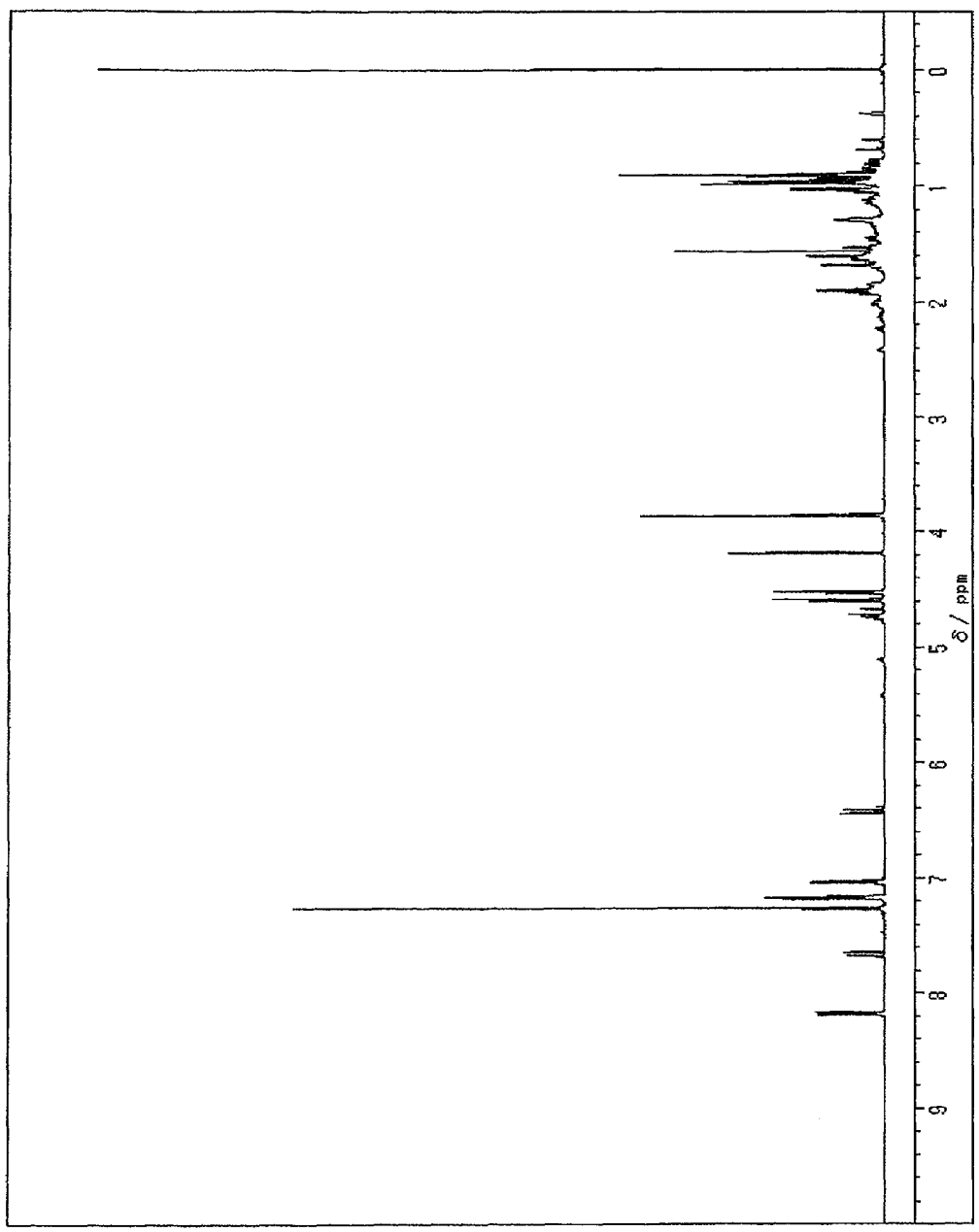
FIG. 4 is a $^1$H-NMR spectrum of the compound (A-4) obtained in Example 4.

A mixture of γ-oryzanol (available from Wako Pure Chemical Industries, Ltd.) (5.0 g, 8.3 mmol), 4-(3-ethyloxetan-3-ylmethyloxy)benzoic acid (2.1 g, 8.7 mmol), dicyclohexylcarbodiimide (1.8 g, 8.7 mmol), 4-dimethylaminopyridine (0.05 g, 0.4 mmol) and dichloromethane (100 mL) was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 300 mL, eluate: toluene/ethyl acetate (volume ratio: 19/1)) to provide 5.5 g of the compound (A-4) as colorless crystals (yield: 81%). The chemical structure thereof was confirmed by ¹H-NMR (FIG. 4). HTP thereof was 3.7 (−μm). In the formula (A-4) above, R''' represents a sterol moiety derived from γ-oryzanol.

Example 5

Synthesis of Compound (A-5)

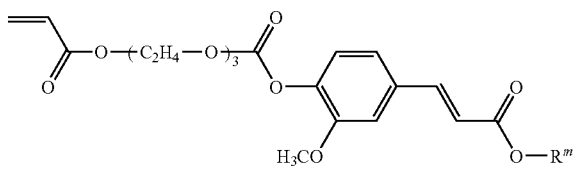

Figure 5:
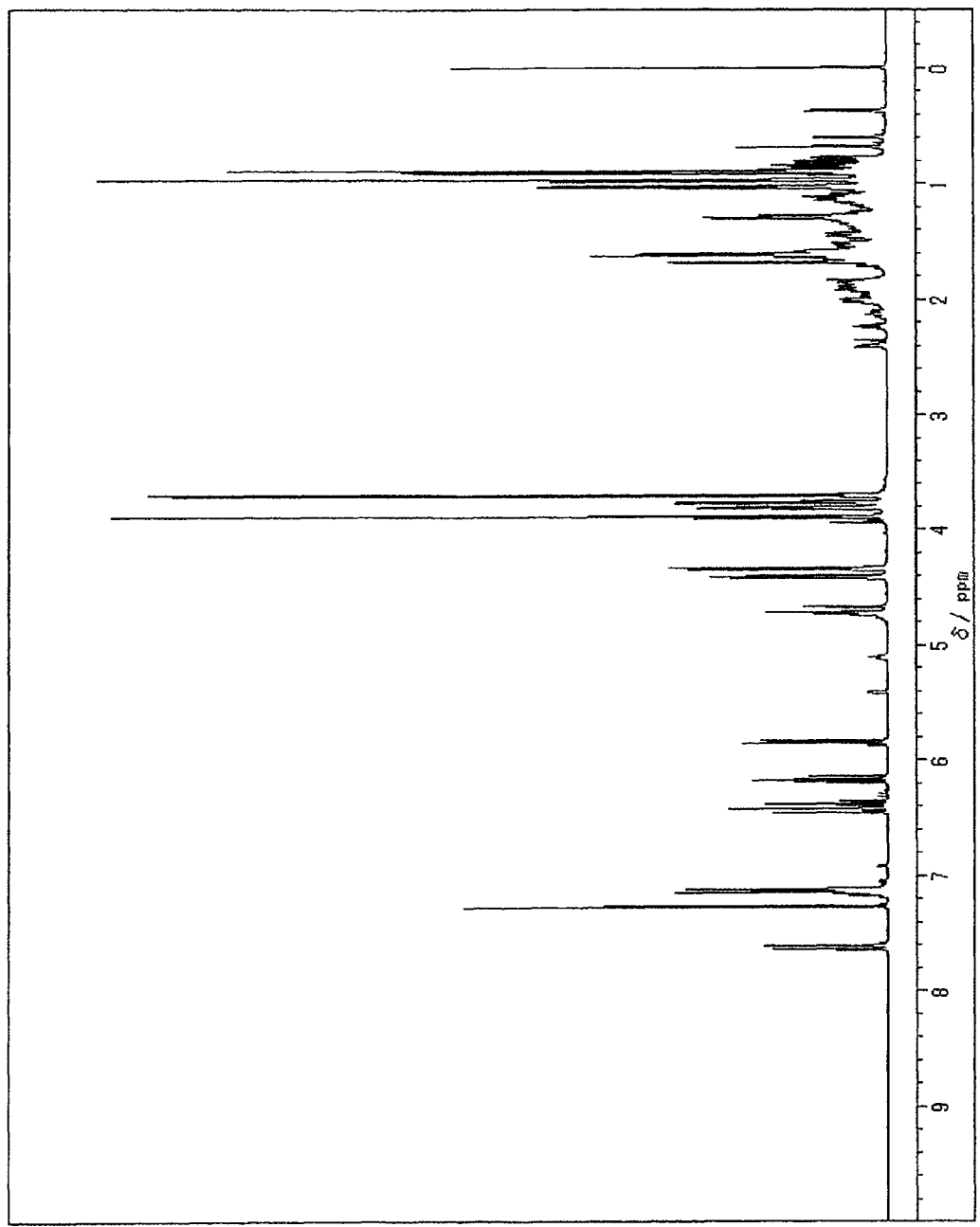
FIG. 5 is a $^1$H-NMR spectrum of the compound (A-5) obtained in Example 5.

To a mixture of γ-oryzanol (available from Wako Pure Chemical Industries, Ltd.) (10 g, 16.7 mmol), triethylamine (3.4 g, 33.2 mmol) and dichloromethane (150 mL), a solution (10 mL) of 2-(2-{2-[chlorocarbonyloxy]ethoxy}ethoxy)ethyl acrylate (4.4 g, 16.6 mmol) with dichloromethane was added dropwise under cooling with ice, and the mixture was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 400 mL, eluate: toluene/ethyl acetate (volume ratio: 19/1)) to provide 4.3 g of the compound (A-5) as a viscous solid (yield: 31%). The chemical structure thereof was confirmed by ¹H-NMR (FIG. 5). HTP thereof was 1.7 (−μm). In the formula (A-5) above, R''' represents a sterol moiety derived from γ-oryzanol.

Example 6

Synthesis of Compound (A-6)

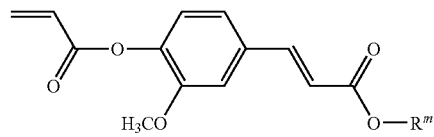

To a mixture of γ-oryzanol (available from Wako Pure Chemical Industries, Ltd.) (2.0 g, 3.2 mmol), pyridine (0.28 g, 3.5 mmol) and toluene (50 mL), a solution (3.1 mL) of acrylic acid chloride (0.35 g, 3.8 mmol) with dichloromethane was added dropwise at room temperature, and the mixture was stirred at room temperature for 3 hours. The mixture was washed with 1M hydrochloric acid, a 2M sodium hydroxide aqueous solution and water in this order, and the organic solvent was distilled off under reduced pressure. The residue was purified by column chromatography (silica gel: 100 mL, eluate: toluene/ethyl acetate (volume ratio: 50/1)) to provide 0.8 g of the compound (A-6) as a viscous solid (yield: 38%). HTP thereof was 3 (−μm). In the formula (A-6) above, R''' represents a sterol moiety derived from γ-oryzanol.

Example 7

Production of Optical Thin Film (C-1)

A solution obtained by adding toluene (9.0 g) and a polymerization initiator (Irgacure 907, a trade name, available from Ciba Speciality Chemicals, Inc.) (0.05 g) to the compound (A-1) (1.0 g) obtained in Example 1 was coated on a glass substrate having a polyimide orientation film having been subjected to a rubbing treatment with a spin coater (1,200 rpm). The solvent in the solution was removed by placing the coated substrate on a hot plate at 70° C. for 3 minutes to orient the liquid crystal layer. The liquid crystal layer was irradiated with an ultraviolet ray (20 mW/cm², 365 nm) with a super-high pressure mercury lamp (250 W) in a nitrogen atmosphere at 25° C. for 30 seconds to provide an optical thin film (C-1) exhibiting red selective reflection.

Example 8

Production of Photopolymerizable Liquid Crystal Composition (Mix-1) and Optical Thin Film (C-2)

A liquid crystal composition (Mix-1) containing the compound (A-1) obtained in Example 1 (50% by weight) and the compound (A-2) obtained in Example 2 (50% by weight) was prepared.

A solution obtained by adding toluene (4.0 g) and a polymerization initiator (Darocure TPO, a trade name, available from Ciba Speciality Chemicals, Inc.) (0.05 g) to the composition (Mix-1) (1.0 g) was coated on a glass substrate with a spin coater (1,200 rpm). The solvent in the solution was removed by placing the coated substrate on a hot plate at 70° C. for 3 minutes to orient the liquid crystal layer. The liquid crystal layer was irradiated with an ultraviolet ray (20 mW/cm², 365 nm) with a super-high pressure mercury lamp (250 W) in a nitrogen atmosphere at 25° C. for 30 seconds to provide an optical thin film (C-2) exhibiting red selective reflection.

Example 9

Production of Photopolymerizable Liquid Crystal Composition (Mix-2) and Optical Thin Film (C-3)

A liquid crystal composition (Mix-2) containing the compound (A-1) obtained in Example 1 (80% by weight) and a compound (B-1) shown below (20% by weight) was prepared.

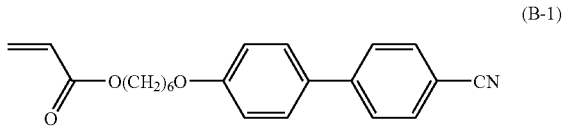

A solution obtained by adding toluene (4.0 g) and a polymerization initiator (Darocure TPO, a trade name, available from Ciba Speciality Chemicals, Inc.) (0.05 g) to the composition (Mix-2) (1.0 g) was coated on a glass substrate with a spin coater (1,200 rpm). The solvent in the solution was removed by placing the coated substrate on a hot plate at 70° C. for 3 minutes to orient the liquid crystal layer. The liquid crystal layer was irradiated with an ultraviolet ray (20 mW/cm², 365 nm) with a super-high pressure mercury lamp (250 W) in a nitrogen atmosphere at 25° C. for 30 seconds to provide an optical thin film (C-3) exhibiting red selective reflection.

The compound of the invention having a sterol moiety has various advantages, for example, the compound has a wide temperature range of a liquid crystal phase, can be polymerized by irradiation of an electromagnetic wave, is excellent in solubility with other liquid crystal compounds, and decreases the crystallization temperature of a composition obtained by mixing the compound. A polymer obtained with a liquid crystal composition containing the compound (1) is excellent in various characteristics, such as transparency, mechanical strength, coating property, solubility, degree of crystallinity, contraction property, water permeation property, water absorption property, gas permeation property, melting point, glass transition point, clearing point, heat resistance and chemical resistance. The polymer can be applied to various purposes, such as a polarizing plate, an optical compensation plate, an orientation film, a liquid crystal display device and a nonlinear optical device.

What is claimed is:

1. A compound represented by formula (1):

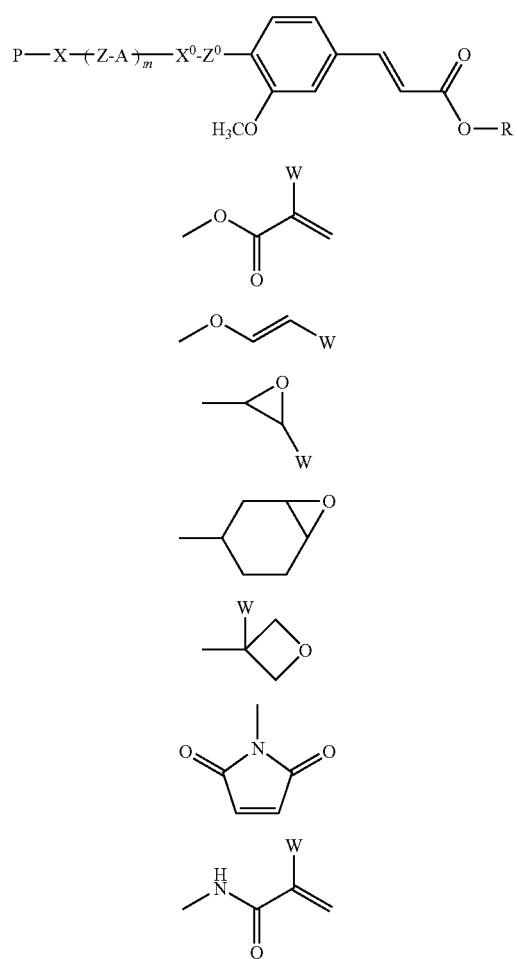

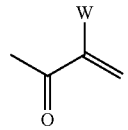

wherein A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH₂CH₂—, —CH₂O—, —OCH₂—, CF₂CF₂, —CH=CH—, —CF=CF—, —C≡C—, —CF₂O—, —OCF₂—, —CH₂CH₂CF₂—, —OCF₂CH₂CH₂—, —CH₂CH₂COO—, —OCOCH₂CH₂—, —CH=CHCOO—, —OCOCH=CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; X⁰ represents a single bond or alkylene having from 1 to 20 carbon atoms, and in the alkylene, arbitrary —CH₂— may be replaced by —O—, —S— or —CH=CH—, and arbitrary hydrogen may be replaced by fluorine; Z⁰ represents —O—, —COO— or —OCOO—; X represents a single bond or alkylene having from 1 to 20 carbon atoms, and in the alkylene, arbitrary —CH₂— may be replaced by —O—, —S—, —COO—, —OCO— or —OCOO—, and arbitrary hydrogen may be replaced by fluorine; R represents a sterol moiety derived from vegetable organisms; P represents one of polymerizable groups represented by formulae (P1) to (P8); and W represents hydrogen, halogen, alkyl having from 1 to 3 carbon atoms or fluoroalkyl having from 1 to 3 carbon atoms.

2. The compound according to claim 1, wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH₂CH₂—, —CH₂O—, —OCH₂—, —CH=CH—, —C≡C—, —CH₂CH₂COO—, —OCOCH₂CH₂—, —CH=CHCOO—, —OCOCH=CH—, —C≡CCOO— or —OCOC≡O—; X⁰ represents a single bond or alkylene having from 1 to 20 carbon atoms, and in the alkylene, arbitrary —CH₂— may be replaced by —O—, —S— or —CH=CH—, and arbitrary hydrogen may be replaced by fluorine; Z⁰ represents —O—, —COO— or —OCOO—; X represents a single bond or alkylene having from 1 to 20 carbon atoms, and in the alkylene, arbitrary —CH₂— may be replaced by —O—, —S—, —COO—, —OCO— or —OCOO—, and arbitrary hydrogen may be replaced by fluorine; P represents one of groups represented by formulae (P1), (P6), (P7) and (P8); and R represents one of groups represented by formulae (Ory1) to (Ory6):

47

(Ory1) 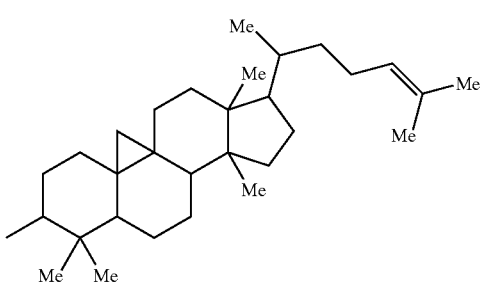

(Ory2) 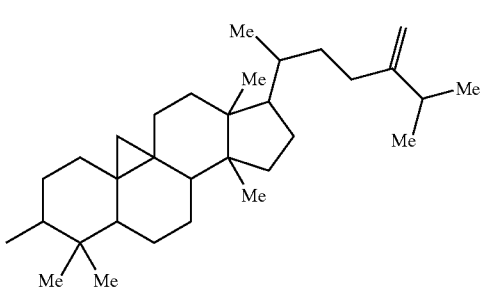

(Ory3) 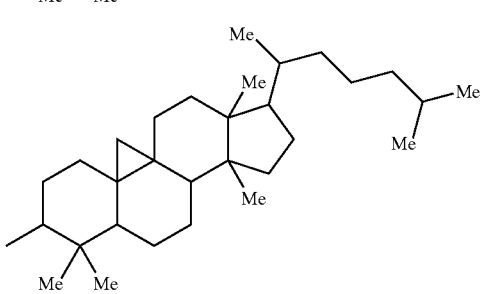

(Ory4) 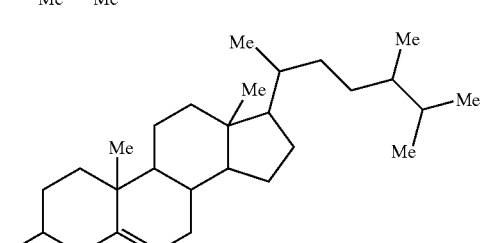

(Ory5) 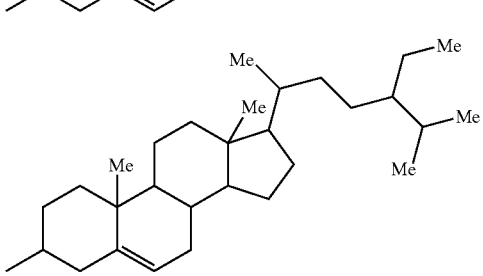

(Ory6) 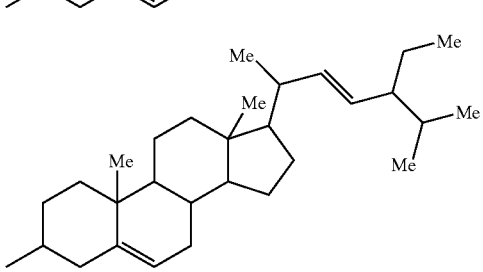

wherein Me represents methyl.

3. The compound according to claim 1, wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; P represents one of groups represented by formulae (P3), (P4) and (P5); and R represents one of groups represented by formulae (Ory1) to (Ory6).

4. The compound according to claim 2, wherein A represents 1,4-cyclohexylene or 1,4-phenylene, and arbitrary hydrogen of the rings may be replaced by fluorine, chlorine, methyl or trifluoromethyl; Z represents a single bond, —COO—, —OCO—, —OCOO—, —CH$_2$CH$_2$—, —CH═CH—, —CH$_2$CH$_2$COO—, —OCOCH$_2$CH$_2$—, —CH═CHCOO— or —OCOCH═CH—; $X^0$ represents a single bond or alkylene having from 1 to 10 carbon atoms, and in the alkylene, arbitrary —CH$_2$— may be replaced by —O—, and arbitrary hydrogen may be replaced by fluorine; $Z^0$ represents —O— or —COO—; X represents a single bond or alkylene having from 1 to 10 carbon atoms, and in the alkylene, arbitrary —CH$_2$— may be replaced by —O—, —COO— or —OCO—, and arbitrary hydrogen may be replaced by fluorine; P represents one of groups represented by formulae (P1), (P3) and (P5); W represents hydrogen, fluorine, chlorine, methyl, ethyl or trifluoromethyl; and R represents one of groups represented by formulae (Ory1) to (Ory6).

5. A compound represented by formula (1-m):

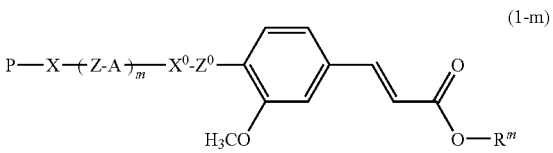

(1-m)

wherein A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CF$_2$CF$_2$—, —CH═CH—, —CF═CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH═CHCOO—, —OCOCH═CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; $R^m$ represents a sterol moiety derived from γ-oryzanol; and P represents one of polymerizable groups represented by formulae (P1) to (P8):

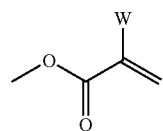
(P1)

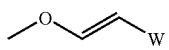
(P2)

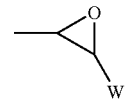
(P3)

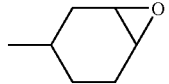
(P4)

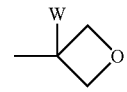
(P5)

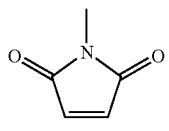
(P6)

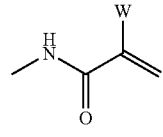
(P7)

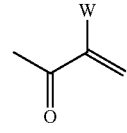
(P8)

wherein W represents hydrogen, halogen, alkyl having from 1 to 3 carbon atoms or fluoroalkyl having from 1 to 3 carbon atoms.

6. The compound according to claim 5, wherein the compound is obtained by reacting a compound represented by formula (1-LC) and γ-oryzanol represented by (1-Ory):

$$P—X—(Z-A)_m—X^0—Y \quad \text{(1-LC)}$$

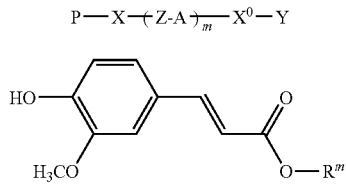
(1-Ory)

wherein, in formula (1-LC), A represents 1,4-cyclohexylene, 1,4-phenylene, 1,3-phenylene, 1,4-cyclohexenylene, pyridin-2,5-diyl, pyridazin-3,6-diyl, pyrimidin-2,5-diyl, bicyclo[2.2.2]octan-1,4-diyl, naphthalen-2,6-diyl, tetrahydronaphthalen-2,6-diyl, fluoren-2,7-diyl or 1,3-dioxan-2,5-diyl, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CF$_2$CF$_2$—, —CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—; m represents an integer of from 0 to 3, and when m is 2 or 3, plural groups represented by A may be the same as or different from each other, and plural groups represented by Z may be the same as or different from each other; $X^0$ represents a single bond or alkylene having from 1 to 20 carbon atoms, and in the alkylene, arbitrary —CH$_2$— may be replaced by —O—, —S— or —CH=CH—, and arbitrary hydrogen may be replaced by fluorine; Y represents —OH, —COOH, —COCl or —OCOOH; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; and P represents one of polymerizable groups represented by formulae (P1) to (P8):

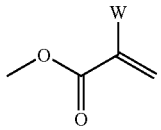
(P1)

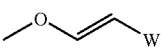
(P2)

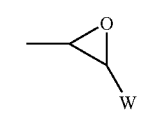
(P3)

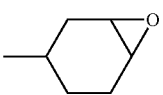
(P4)

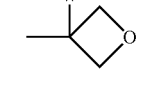
(P5)

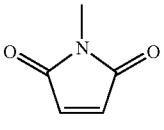
(P6)

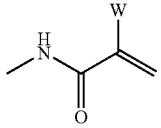
(P7)

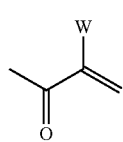
(P8)

wherein W represents hydrogen, halogen, alkyl having from 1 to 3 carbon atoms or fluoroalkyl having from 1 to 3 carbon atoms, and $R^m$ in the formula (1-Ory) represents a sterol moiety derived from γ-oryzanol.

7. The compound according to claim 5, wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; and P represents one of groups represented by formulae (P1), (P6), (P7) and (P8).

8. The compound according to claim 5, wherein A represents 1,4-cyclohexylene or 1,4-phenylene, and arbitrary hydrogen of the rings may be replaced by halogen, alkyl having from 1 to 3 carbon atoms or fluoroalkyl having from 1 to 3 carbon atoms; Z represents a single bond, —COO—, —OCO—, —OCOO—, —CH$_2$CH$_2$—, —CH$_2$O—, —OCH$_2$—, —CH═CH—, —C≡C—, —CH$_2$CH$_2$COO—, —OCOCH$_2$CH$_2$—, —CH═CHCOO—, —OCOCH═CH—, —C≡CCOO— or —OCOC≡C—; $X^0$ represents a single bond or alkylene having from 1 to 20 carbon atoms, and in the alkylene, arbitrary —CH$_2$— may be replaced by —O—, —S— or —CH═CH—, and arbitrary hydrogen may be replaced by fluorine; $Z^0$ represents —O—, —COO— or —OCOO—; X represents a single bond or alkylene having from 1 to 20 carbon atoms, and in the alkylene, arbitrary —CH$_2$— may be replaced by —O—, —S—, —COO—, —OCO— or —OCOO—, and arbitrary hydrogen may be replaced by fluorine; and P represents one of groups represented by formulae (P3), (P4) and (P5).

9. The compound according to claim 5, wherein A represents 1,4-cyclohexylene or 1,4-phenylene, and arbitrary hydrogen of the rings may be replaced by fluorine, chlorine, methyl or trifluoromethyl; Z represents a single bond, —COO—, —OCO—, —OCOO—, —CH$_2$CH$_2$—, —CH═CH—, —CH$_2$CH$_2$COO—, —OCOCH$_2$CH$_2$—, —CH═CHCOO— or —OCOCH═CH—; $X^0$ represents a single bond or alkylene having from 1 to 10 carbon atoms, and in the alkylene, arbitrary —CH$_2$— may be replaced by —O—, and arbitrary hydrogen may be replaced by fluorine; $Z^0$ represents —O— or —COO—; X represents a single bond or alkylene having from 1 to 10 carbon atoms, and in the alkylene, arbitrary —CH$_2$— may be replaced by —O—, —COO— or —OCO—, and arbitrary hydrogen may be replaced by fluorine; P represents one of polymerizable groups represented by formulae (P1), (P3) and (P5); and W represents hydrogen, fluorine, chlorine, methyl, ethyl or trifluoromethyl.

10. The compound according to claim 9, wherein $Z^0$ represents —COO—; and X represents alkylene having from 1 to 10 carbon atoms, and in the alkylene, arbitrary —CH$_2$— may be —O—, but two groups of —CH$_2$— adjacent to each other are not replaced by —O—.

11. A liquid crystal composition comprising at least one of the compound according to claim 5, and comprising at least two compounds.

12. The liquid crystal composition according to claim 11, wherein all the compounds constituting the liquid crystal composition are each a polymerizable liquid crystal compound.

13. A liquid crystal composition comprising at least one of the compounds according to claim 5, and at least one polymerizable compound selected from the group consisting of compounds represented by formula (M1) and compounds represented by formula (M2), all the compounds constituting the liquid crystal composition are each a polymerizable liquid crystal compound, the compound according to claim 5 is contained in an amount of from 0.1 to 99.9% by weight based on the total amount of the composition, and the at least one polymerizable compound selected from the group consisting of the compounds represented by formula (M1) and the compounds represented by formula (M2) is contained in an amount of from 0.1 to 99.9% by weight based on the total amount of the composition:

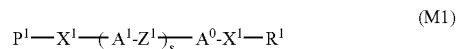
(M1)

(M2)

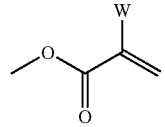
(P9)

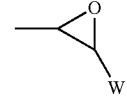
(P10)

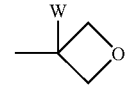
(P11)

(P12)

wherein $P^1$ independently represents one of polymerizable groups represented by formulae (P9) to (P12); W represents hydrogen, halogen, alkyl having from 1 to 3 carbon atoms or fluoroalkyl having from 1 to 3 carbon atoms; $R^1$ represents hydrogen, fluorine, chlorine, —CN or alkyl having from 1 to 20 carbon atoms, and in the alkyl, arbitrary —CH$_2$— may be replaced by —O—, —COO—, —OCO— or —OCOO—, and arbitrary hydrogen may be replaced by halogen; $A^0$ and $A^1$ each independently represents 1,4-cyclohexylene, 1,4-phenylene, 1,3-phenylene, pyridin-2,5-diyl, pyrimidin-2,5-diyl, naphthalen-2,6-diyl or fluoren-2,7-diyl, and arbitrary hydrogen of the rings may be replaced by halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by —O—, —COO—, —OCO— or —OCOO—; $Z^1$ independently represents a single bond, —COO—, —OCO—, —OCOO—, —$CH_2CH_2$—, —CH=CH—, —C≡C—, —$CH_2$O—, —O$CH_2$—, —$CF_2$O—, —OC$F_2$—, —CH=CHCOO— or —OCOCH=CH—; and s represents an integer of from 1 to 3, and when s is 2 or 3, plural groups represented by $A^1$ may be the same as or different from each other, and plural groups represented by $Z^1$ may be the same as or different from each other.

14. The liquid crystal composition according to claim 13, wherein the polymerizable compounds selected from the group consisting of the compounds represented by formulae (M1) and (M2) are compounds represented by formulae (M1a), (M1b), (M1c), (M2a), (M2b) and (M2c):

dently represents 1,4-cyclohexylene or 1,4-phenylene; $W^1$ independently represents hydrogen, halogen, alkyl having from 1 to 3 carbon atoms or halogenated alkyl having from 1 to 3 carbon atoms; $X^1$ independently represents a single bond or alkylene having from 1 to 20 carbon atoms, and in the alkylene, arbitrary —$CH_2$— may be replaced by —O—, —COO—, —OCO— or —OCOO—; p and q each independently represents 0 or 1; and n independently represents an integer of from 0 to 5.

15. A polymer being obtained by polymerizing at least one of the compound according to claim 5.

16. A polymer being obtained by polymerizing the composition according to claim 11.

17. A molded article having optical anisotropy being obtained by orienting at least one compound according to claim 5 or a liquid crystal composition comprising at least two compounds at least one of which is a compound according to claim 5 applied on a substrate, polymerizing the compound or

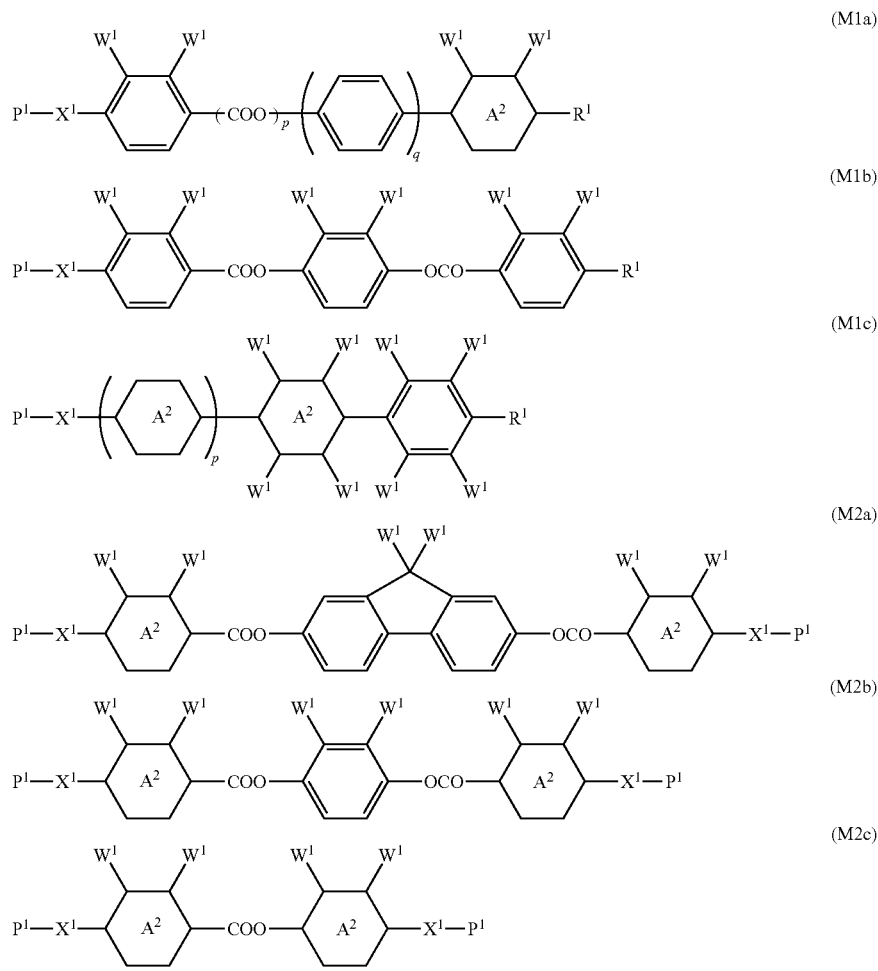

wherein $P^1$ represents one of polymerizable groups represented by formulae (P9) to (P12); $R^1$ represents hydrogen, fluorine, chlorine, —CN or alkyl having from 1 to 20 carbon atoms, and in the alkyl, arbitrary —$CH_2$— may be replaced by —O—, —COO—, —OCO— or —OCOO—, and arbitrary hydrogen may be replaced by halogen; ring $A^2$ indepenthe composition by irradiating with an electromagnetic wave, and thereby immobilizing molecular orientation in a liquid crystal phase.

18. The molded article according to claim 17, wherein the molecular orientation having been immobilized is twist orientation.

19. An optical device comprising the molded article according to claim 17.

20. The optical device according to claim 19, wherein the optical device exhibits selective reflection.

21. The optical device according to claim 20, wherein the optical device exhibits circularly polarized light dichroic property for light in a part or the whole region of a wavelength of from 350 to 750 nm.

22. The optical device according to claim 20, wherein the optical device exhibits circularly polarized light dichroic property in an ultraviolet region of a wavelength of from 100 to 350 nm.

23. A liquid crystal display device comprising the compound according to claim 5.

24. A liquid crystal display device comprising the molded article according to claim 17.

25. A liquid crystal display device comprising the optical device according to claim 19.

26. A film comprising the polymer according to claim 15.

27. A liquid crystal display device comprising the composition according to claim 11.

28. A liquid crystal display device comprising the polymer according to claim 15.

29. A liquid crystal display device comprising the molded article according to claim 16.

30. A film comprising the polymer according to claim 16.

* * * * *